US011830246B2

(12) United States Patent
Fleisig et al.

(10) Patent No.: US 11,830,246 B2
(45) Date of Patent: Nov. 28, 2023

(54) SYSTEMS AND METHODS FOR EXTRACTING AND VECTORIZING FEATURES OF SATELLITE IMAGERY

(71) Applicant: CACI, Inc.—Federal, Arlington, VA (US)

(72) Inventors: Jacob A. Fleisig, Arlington, VA (US); Evan M. Colvin, Arlington, VA (US); Peter Storm Simonson, Arlington, VA (US); Nicholas Grant Chidsey, Arlington, VA (US)

(73) Assignee: CACI, Inc.—Federal, Reston, VA (US)

( * ) Notice: Subject to any disclaimer, the term of this patent is extended or adjusted under 35 U.S.C. 154(b) by 485 days.

(21) Appl. No.: 16/864,756

(22) Filed: May 1, 2020

(65) Prior Publication Data

US 2021/0342585 A1 Nov. 4, 2021

(51) Int. Cl.

*G06V 20/10* (2022.01)
*G06N 20/00* (2019.01)

(Continued)

(52) U.S. Cl.

CPC ............ *G06V 20/176* (2022.01); *G06F 17/16* (2013.01); *G06N 3/04* (2013.01); *G06N 20/00* (2019.01);

(Continued)

(58) Field of Classification Search

CPC .... G06V 10/34; G06V 10/762; G06V 10/457; G06V 20/10; G06V 20/176; G06V 20/182; G01C 21/3852; G01C 21/3815; G06T 17/05; G06T 5/002; G06T 7/12; G06T 7/155; G06T 2207/30184; G06T 2207/10032; G06T 2207/20081;

(Continued)

(56) References Cited

U.S. PATENT DOCUMENTS

2018/0260648 A1* 9/2018 Yang ..................... G06V 10/25
2021/0027055 A1* 1/2021 Rainbow ............. G06V 10/507

OTHER PUBLICATIONS

Zu S, Wan L, Li D, Qiu Z. RoadRouter: Multi-Task Learning of Road Network Extraction with Graph Representation. In 2020 2nd International Conference on Advances in Computer Technology, Information Science and Communications (CTISC) Mar. 20, 2020 ( pp. 148-160). IEEE. (Year: 2020).*

(Continued)

*Primary Examiner* — Vu Le
*Assistant Examiner* — Tracy Mangialaschi
(74) *Attorney, Agent, or Firm* — BakerHostetler

(57) ABSTRACT

A system may be configured to collect geospatial features (in vector form) such that a software application is operable to edit an object represented by at least one vector. Some embodiments may: generate, via a trained machine learning model, a pixel map based on an aerial or satellite image; convert the pixel map into vector form; and store the vectors. This conversion may include a raster phase and a vector phase. A system may be configured to obtain another image, generate another pixel map based on the other image, convert the other pixel map into vector form, and compare the vectors to identify changes between the images. Some implementations may cause identification, based on a similarity with converted vectors, of a more trustworthy set of vectors for subsequent data source conflation.

11 Claims, 16 Drawing Sheets

(51) Int. Cl.
*G06N 3/04* (2023.01)
*G06T 5/00* (2006.01)
*G06F 17/16* (2006.01)

(52) U.S. Cl.
CPC ............ *G06T 5/002* (2013.01); *G06V 20/182* (2022.01); *G06T 2207/20044* (2013.01); *G06T 2207/20081* (2013.01); *G06T 2207/20084* (2013.01)

(58) Field of Classification Search
CPC ........... G06T 2207/20044; G06T 2207/20084; G06N 3/04; G06N 3/0454; G06N 3/084; G06N 3/0481; G06N 20/00; G06N 7/005; G06N 5/003; G06N 7/01; G06N 5/01; G06F 17/16
See application file for complete search history.

(56) References Cited

OTHER PUBLICATIONS

Batra, Anil, et al. "Improved road connectivity by joint learning of orientation and segmentation." Proceedings of the IEEE/CVF Conference on Computer Vision and Pattern Recognition. 2019. (Year: 2019).*

Biagioni, James, and Jakob Eriksson. "Map inference in the face of noise and disparity." Proceedings of the 20th International Conference on Advances in Geographic Information Systems. 2012. (Year: 2012).*

Ahmadi, F. Farnood, et al. "The application of neural networks, image processing and cad-based environments facilities in automatic road extraction and vectorization from high resolution satellite images." Int'l archives of photogrammetry, remote sensing & spatial information sciences 37 (2008). (Year: 2008).*

Li Z, Wegner JD, Lucchi A. Topological Map Extraction From Overhead Images. In 2019 IEEE/CVF International Conference on Computer Vision (ICCV) (pp. 1715-1724). IEEE. (Year: 2019).*

Simon Jégou et al.; "The One Hundred Layers Tiramisu: Fully Convolutional DenseNets for Semantic Segmentation"; Cornell University; Computer Science—Computer Vision and Pattern Recognition; Oct. 31, 2017; pp. 1-9.

Lin Gao et al.; "Road Extraction from High-Resolution Remote Sensing Imagery Using Refined Deep Residual Convolutional Neural Network"; Remote Sensing; vol. 11; No. 5; 2019; pp. 1-16.

Olaf Ronneberger et al.; "U-Net: Convolutional Networks for Biomedical Image Segmentation"; Cornell University; Computer Science—Computer Vision and Pattern Recognition; May 18, 2015; pp. 1-8.

Introduction—Philosophy—Rasterio License; p. 1.

* cited by examiner

FIG. 2

SYSTEMS AND METHODS FOR EXTRACTING AND VECTORIZING FEATURES OF SATELLITE IMAGERY

TECHNICAL FIELD

The present disclosure relates generally to systems and methods for foundational feature extraction and vectorization of roads in geospatial imagery. More particularly, pixel maps outputted from machine learning networks are converted into usable vectors.

BACKGROUND

Roads play a key role in the development of transportation systems, including the addition of automatic road navigation, unmanned vehicles, and urban planning, which are important in both industry and daily living. For at least this reason, there is a need for automatic road extraction from high-resolution optical, remote-sensing imagery. Such road extraction, though, is complicated at least by certain road structures, complex backgrounds, heterogeneous regions, and blockages by obstacles either through shadow occlusion or visual occlusion.

Currently, geospatial intelligence analysts annotate images by hand using map software, the identified features being stored as vectors. Such manual feature extraction from satellite imagery is error-prone, time consuming, and volume limited. There is thus a further need to get results from image segmentation into usable vectors. More particularly, there is a need in the field of machine learning to make outputs of segmentation networks usable to geospatial analysts.

SUMMARY

Systems and methods are disclosed for artificial intelligence (AI) assisted foundational feature extraction so that a software application is operable to edit objects represented by vectors. Some embodiments may: generate, via a trained machine learning model, a pixel map based on an aerial or satellite image; convert the pixel map into vector form; and store, in a certain file type, the vectors. A system may be configured to obtain another image, generate another pixel map based on the other image, convert the other pixel map into vector form, and compare the vectors to identify changes between the images. And a system may be configured to identify, based on a similarity of converted vectors, a more trustworthy set of vectors for subsequent data source conflation.

Accordingly, one or more aspects of the present disclosure relate to methods for implementing disclosed systems, which may comprise one or more hardware processors configured by machine-readable instructions and/or other components. Each system may comprise the one or more processors and other components or media, e.g., upon which machine-readable instructions may be executed. Implementations of any of the described techniques and architectures may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure.

FIG. 2 illustrates an outputting of a pixel map, in accordance with one or more embodiments.

DETAILED DESCRIPTION

Figure 1:
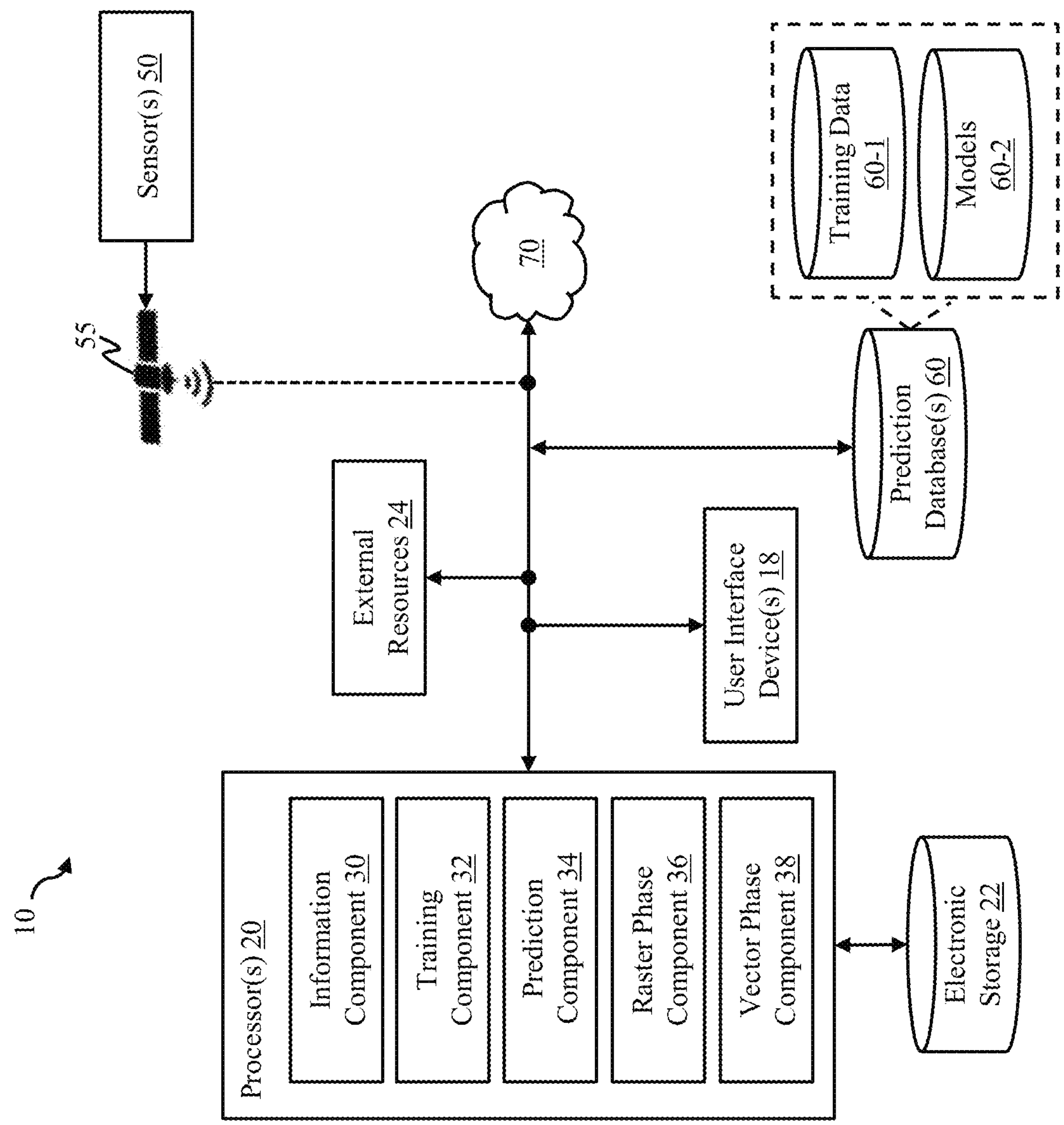
FIG. 1 illustrates an example of a system in which particular objects are collected from satellite imagery, in accordance with one or more embodiments.

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other.

Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

Presently disclosed are ways of using a neural network (e.g., convolutional neural networks (CNN)) to perform semantic segmentation of objects in satellite imagery. For instance, after receiving an image of a city block, system 10 of FIG. 1 may return a pixel map. This pixel map may show what type or class of object each pixel in the image is part of (e.g., road, background, etc.). This pixel map may then be vectorized. Each of the vectors may comprise one or more points, lines, and/or polygons.

In the vectorization, the pixel map may be turned into vector data. Upon completing the vectorization, the road vector data may be freely manipulated and edited by analysts in any geographic information system (GIS) software application (e.g., ArcGIS, QGIS, and the like), which may facilitate visualization, exploration, querying, and spatial data analysis. That is, analysts are known to only work with vector data rather than pixel maps. Software used by an analyst may facilitate processing and manipulation of spatial data, including digitizing, editing, coordinating management, network analysis, surface modeling, and/or grid-cell-based modeling.

The disclosed approach may include different embodiments, including feature collection from satellite imagery, change detection (i.e., knowing how an area has changed over a time period, when a new image of that area has been obtained), and conflation source evaluation (i.e., combining from multiple feature collection rounds into one consolidated file). In some embodiments, processor(s) 20 may be configured to implement the latter functionality to improve technology available to analysts unsure of which source files are accurate, e.g., in view of newest ground imagery. As such, disclosed processor components may extract new features directly from the new imagery, which may then be directly compared to conflation sources to determine which are best.

As shown in FIG. 1, processor(s) 20 is configured via machine-readable instructions to execute one or more computer program components. The computer program components may comprise one or more of information component 30, training component 32, prediction component 34, raster phase component 36, vector phase component 38, and/or other components. Processor 20 may be configured to execute components 30, 32, 34, 36, and/or 38 by: software; hardware; firmware; some combination of software, hardware, and/or firmware; and/or other mechanisms for configuring processing capabilities on processor 20.

In some embodiments, processor(s) 20 may belong to a user device, a consumer electronics device, a mobile phone, a smartphone, a personal data assistant, a digital tablet/pad computer, a wearable device (e.g., watch), a personal computer, a laptop computer, a notebook computer, a work station, a server, a high performance computer (HPC), a vehicle computer, a game or entertainment system, a set-top-box or any other device. As such, processor 20 is configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, UI devices 18, devices that are part of external resources 24, electronic storage 22, and/or other devices).

It should be appreciated that although components 30, 32, 34, 36, and 38 are illustrated in FIG. 1 as being co-located within a single processing unit, in embodiments in which processor 20 comprises multiple processing units, one or more of components 30, 32, 34, 36, and/or 38 may be located remotely from the other components. For example, in some embodiments, each of processor components 30, 32, 34, 36, and 38 may comprise a separate and distinct set of processors. The description of the functionality provided by the different components 30, 32, 34, 36, and/or 38 described below is for illustrative purposes, and is not intended to be limiting, as any of components 30, 32, 34, 36, and/or 38 may provide more or less functionality than is described. For example, one or more of components 30, 32, 34, 36, and/or 38 may be eliminated, and some or all of its functionality may be provided by other components 30, 32, 34, 36, and/or 38. As another example, processor 20 may be configured to execute one or more additional components that may perform some or all of the functionality attributed below to one of components 30, 32, 34, 36, and/or 38.

In some embodiments, the components of processor(s) 20 may work together to identify or collect features (e.g., roads), from among a particular region via foundational feature extraction. A subsequent conversion to vector form may include a raster phase and a vector phase.

In some embodiments, the components of processor(s) 20 may work together to detect changes between maps. For example, information component 30 may obtain two images, each being taken at a different time. In this example, one image of a region may be from March 2019, and the other image of the same region may be from August 2020. In this example, prediction component 34 may collect all roads from the 2019 imagery and collect all roads from the 2020 imagery. Raster phase component 36 and vector phase component 38 may then convert each of the collections into vectors. And then information component 30 may compare the vector file from 2019 with the vector file from 2020 to determine changes in the road network between 2019 and 2020. Alternatively, one old vector dataset and one newer image converted, using the herein-disclosed approach, to a new vector dataset. Then, the two vector datasets may be compared to identify changes and/or automatically conflate or combine the changes.

In some embodiments, the components of processor(s) 20 may work together to conflate different sources and evaluate that conflation for subsequent combination or reconciliation of their data. For example, information component 30 may obtain, from a source, vectors based on an image taken in 2020 of a region, and obtain, from another source, vectors based on an image taken in 2018 of the same region. The vectors of 2020 may represent most or all roads of the region, but the vectors of 2018 may represent only the main roads. An objective may thus be to conflate all of the roads with the main roads, without first knowing which source is a more accurate representation of the ground. As such, information component 30 may determine to which source the other source may be conflated to then take features from the other one for combining (e.g., via a drag and drop operation at a user interface) with a gold standard source. That is, this component may resolve the problem of not knowing which source is the gold standard. To exemplarily accomplish this, information component 30 may obtain raw imagery and extract feature vectors using the herein disclosed approach, e.g., using a neural network. Information component 30 may then perform a vector to vector comparison between what the neural network output is and between the two mentioned sources. The neural network output may be ideal and trustworthy, allowing it to be used as a comparison metric for the other two sources. Information component 30 may determine the vectors of one source that is most alike to the neural network output, effectively designating the one source as the gold standard. This component may then, as mentioned, conflate the other sources into the designated gold standard source.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., a user interface device 18, processor 20, etc.). In some embodiments, electronic storage 22 may be located in a server together with processor 20, in a server that is part of external resources 24, in user interface devices 18, and/or in other locations. Electronic storage 22 may comprise a memory controller and one or more of optically readable storage media (e.g., optical disks, etc.), magnetically readable storage media (e.g., magnetic tape, magnetic hard drive, floppy drive, etc.), electrical charge-based storage media (e.g., RAM, EPROM, EEPROM, etc.), solid-state storage media (e.g., flash drive, etc.), and/or other electronically readable storage media. Electronic storage 22 may store software algorithms, information obtained and/or determined by processor 20, information received via user interface devices 18 and/or other external computing systems, information received from external resources 24, and/or other information that enables system 10 to function as described herein.

External resources 24 may include sources of information (e.g., databases, websites, etc.), external entities participating with system 10, one or more servers outside of system 10, a network, electronic storage, equipment related to Wi-Fi technology, equipment related to Bluetooth® technology, data entry devices, a power supply, a transmit/receive element (e.g., an antenna configured to transmit and/or receive wireless signals), a network interface controller (NIC), a display controller, a graphics processing unit (GPU), and/or other resources. In some implementations, some or all of the functionality attributed herein to external resources 24 may be provided by other components or resources included in system 10. Processor 20, external resources 24, user interface device 18, electronic storage 22, network 70, and/or other components of system 10 may be configured to communicate with each other via wired and/or wireless connections, such as a network (e.g., a local area network (LAN), the Internet, a wide area network (WAN), a radio access network (RAN), a public switched telephone network (PSTN)), cellular technology (e.g., GSM, UMTS, LTE, 5G, etc.), Wi-Fi technology, another wireless communications link (e.g., radio frequency (RF), microwave, infrared (IR), ultraviolet (UV), visible light, cm wave, mm wave, etc.), a base station, and/or other resources.

User interface (UI) device(s) 18 of system 10 may be configured to provide an interface between one or more users and system 10. UI devices 18 are configured to provide information to and/or receive information from the one or more users. UI devices 18 include a user interface and/or other components. The UI may be and/or include a graphical UI configured to present views and/or fields configured to receive entry and/or selection with respect to particular functionality of system 10, and/or provide and/or receive other information. In some embodiments, the UI of UI devices 18 may include a plurality of separate interfaces associated with processor(s) 20 and/or other components of system 10. Examples of interface devices suitable for inclusion in UI device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that UI devices 18 include a removable storage interface. In this example, information may be loaded into UI devices 18 from removable storage (e.g., a smart card, a flash drive, a removable disk) that enables users to customize the implementation of UI devices 18.

In some embodiments, UI devices 18 are configured to provide a UI, processing capabilities, databases, and/or electronic storage to system 10. As such, UI devices 18 may include processors 20, electronic storage 22, external resources 24, and/or other components of system 10. In some embodiments, UI devices 18 are connected to a network (e.g., the Internet). In some embodiments, UI devices 18 do not include processor 20, electronic storage 22, external resources 24, and/or other components of system 10, but instead communicate with these components via dedicated lines, a bus, a switch, network, or other communication means. The communication may be wireless or wired. In some embodiments, UI devices 18 are laptops, desktop computers, smartphones, tablet computers, and/or other UI devices.

Data and content may be exchanged between the various components of the system 10 through a communication interface and communication paths using any one of a number of communications protocols. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol Version 4 (IPv4) and Internet Protocol Version 6 (IPv6).

In some embodiments, sensor(s) 50 may be a charge-coupled device (CCD), an active pixel sensor (e.g., CMOS-based), wide-area motion imagery (WAMI) sensor, passive infrared sensor, ultraviolet radiation sensor, X-ray based, radar based, laser altimeter, radar altimeter, light detection and ranging (LIDAR), radiometer, photometer, spectropolarimetric imager, simultaneous multi-spectral platform (e.g., Landsat), hyperspectral imager, geodetic remote sensor, acoustic sensor (e.g., sonar, seismogram, ultrasound, etc.), or another image capturing device.

In some embodiments, sensor(s) 50 may output an image taken at an altitude, e.g., from satellite 55 or an aircraft 55 (e.g., aerostat, drone, plane, balloon, dirigible, kite, and the like). One or more images may be taken, via mono, stereo, or another combination of a set of sensors. The image(s) may be taken instantaneously or over a period of time. In some embodiments, the input aerial or satellite image may be one of a series of images. For example, the herein-described approach may be applied to a live or on-demand video segment of a geographic region.

System 10 may further prepare and use one or more prediction models to detect certain objects using imagery taken from above, in accordance with one or more embodiments. For example, thousands or even millions of images may be obtained from one or more sources to determine (e.g., "train") neural networks, these images being training data set 60-1.

An artificial neural network (ANN) may be configured to determine a classification (e.g., type of object) based on input image(s). An ANN is a network or circuit of artificial neurons or nodes for solving AI problems. Such artificial networks may be used for predictive modeling.

The prediction models may be and/or include one or more neural networks (e.g., deep neural networks, artificial neural networks, or other neural networks), other machine learning models, or other prediction models. As an example, the neural networks referred to variously herein may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections may be enforcing or inhibitory, in their effect on the activation state of connected neural units. These neural network systems may be self-learning and trained, rather than explicitly programmed, and may perform significantly better in certain areas of problem solving, as compared to traditional computer programs. In some embodiments, neural networks may include multiple layers (e.g., where a signal path traverses from input layers to output layers). In some embodiments, back propagation techniques may be utilized to train the neural networks, where forward stimulation is used to reset weights on the "front" neural units. In some embodiments, stimulation and inhibition for neural networks may be more free-flowing, with connections interacting in a more chaotic and complex fashion.

Disclosed implementations of artificial neural networks may apply a weight and transform the input data by applying a function, this transformation being a neural layer. The function may be linear or, more preferably, a nonlinear activation function, such as a logistic sigmoid, Tanh, or rectified linear activation function (ReLU) function. Intermediate outputs of one layer may be used as the input into a next layer. The neural network through repeated transformations learns multiple layers that may be combined into a final layer that makes predictions. This learning (i.e., training) may be performed by varying weights or parameters to minimize the difference between the predictions and expected values. In some embodiments, information may be fed forward from one layer to the next. In these or other embodiments, the neural network may have memory or feedback loops that form, e.g., a neural network. Some embodiments may cause parameters to be adjusted, e.g., via back-propagation.

A convolutional neural network (CNN) is a sequence of hidden layers, such as convolutional layers interspersed with activation functions. Typical layers of a CNN are thus a convolutional layer, an activation layer, batch normalization, and a pooling layer. Each output from one of these layers is an input for a next layer in the stack, the next layer being, e.g., another one of the same layer or a different layer. For example, a CNN may have two sequential convolutional layers. In another example, a pooling layer may follow a convolutional layer. When many hidden, convolutional layers are combined, this is called deep stacking and is an instance of deep learning.

Convolutional layers apply a convolution operation to an input to pass a result to the next layer. That is, these layers may operate by convolving a filter matrix with the input image, the filter being otherwise known as a kernel or receptive field. Filter matrices may be based on randomly assigned numbers that get adjusted over a certain number of iterations with the help of a backpropagation technique. Filters may be overlaid as small lenses on parts, portions, or features of the image, and use of such filters lends to the mathematics behind performed matching to break down the image. That is, by moving the filter around to different places in the image, the CNN may find different values for how well that filter matches at that position. For example, the filter may be slid over the image spatially to compute dot products after each slide iteration. From this matrix multiplication, a result is summed onto a feature map.

The area of the filter may be a small amount of pixels (e.g., 5) by another small amount of pixels (e.g., 5). But filters may also have a depth, the depth being a third dimension. This third dimension may be based on each of the pixels having a color (e.g., RGB). For this reason, CNNs are often visualized as three-dimensional (3D) boxes.

In the disclosed CNN, a first convolutional layer may learn edges of an image (e.g., edges of a road). Similarly, the first convolutional layer may learn bright or dark spots of the image. A second convolutional layer may use these learned features to learn shapes or other recognizable features, the second layer often resulting in pattern detection to activate for more complex shapes. And a third or subsequent convolutional layer may heuristically adjust the network structure to recognize an entire object (e.g., recognize a road) from within the image or a tile of the image.

An exemplary CNN may comprise an $M \times N \times O$ filter (e.g., $5 \times 5 \times 3$ pixels, M, N, and O each being any suitable integer) filter that initially convolves over at least a portion of an image or tile, which may have any suitable pixel dimensions. The disclosed convolution(s) may be performed by overlaying a filter on a spatial location of the image and multiplying all the corresponding values together at each spatial location as the filter convolves (e.g., slides, correlates, etc.) across one pixel (spatial location) at a time. In some embodiments, the filters for one layer may be of different number and size than filters of other layers. Also, the stride does not have to be one spatial location at a time. For example, a CNN may be configured to slide the filter across two or three spatial locations each iteration.

After each convolutional layer, it is conventional to apply a nonlinear (activation) layer immediately afterward, such as a ReLU, Softmax, Sigmoid, tanh, Softmax, and/or Leaky layer. For example, ReLUs may be used to change negative values (e.g., from the filtered images) to zero.

In some embodiments, a batch normalization layer may be used. The batch normalization layer may be used to normalize an input layer by adjusting and scaling the activations. Batch normalization may exist before or after an activation layer. To increase the stability of a neural network, batch normalization normalizes the output of a previous activation layer by subtracting the batch mean and dividing by the batch standard deviation.

In some embodiments, a pooling layer (e.g., maximum pooling, average pooling, etc.) may be used. For example, maximum pooling is a way to shrink the image stack by taking a maximum value in each small collection of an incoming matrix (e.g., the size of a filter). Shrinking is practical for large images (e.g., $9000 \times 9000$ pixels). The resulting stack of filtered images from convolutional layer(s) may therefore become a stack of smaller images.

A first phase of the disclosed CNN is feature extraction from images via a combination of one or more of the mentioned layers, and then classification for prediction is performed in a second phase via one or more fully connected layers. The final, output layer of a CNN may thus be a fully connected neural network, which may precisely identify an object in the input image or identify an attribute of the object or of the image as a whole. In addition, to prevent overfitting of the image, some embodiments may use dropout, as a generalization technique. The fully connected layers may connect every neuron in one layer to every neuron in other layer(s). In direct contrast, the neurons of preceding layers in the CNN may only have local connections (e.g., with respect to nearby pixels). Before reaching the fully connected layer, some embodiments may flatten the output from a previous layer. The flattened matrix may then go through a fully connected layer for classifying at least portions of the image.

The fully connected neural network of disclosed embodiments may draw associations between extracted textual features and recognized image elements. That is, in some embodiments, the fully connected layer(s) may be fed image features from the convolutional blocks of different attribute recognition paths (i.e., each path being used for recognizing a different attribute). This layer may then output an image classification prediction.

In some embodiments, system 10 may comprise a CNN that is fully convolutional. In these or other embodiments, system 10 may comprise a fully connected neural network (FCNN). Prediction component 34 may apply a CNN on an input image to identify within it a particular shape and/or other attribute(s) in order to then determine whether the image comprises, e.g., road(s).

The structure of the CNN (e.g., number of layers, types of layers, connectivity between layers, and one or more other structural aspects) may be selected, and then the parameters of each layer may be determined by training. Some embodiments may train the CNN by dividing a training data set into a training set and an evaluation set and then by using the training set. Training prediction models with known data improves accuracy and quality of outputs. Once trained by training component 32, a prediction model from database 60-2 of FIG. 1 may generate the various different predictions described herein.

In some embodiments, after manually identifying and labelling data for the training, test, and validation data sets, training component 32 may perform artificial augmentation of the training data set to allow the neural network to learn more precisely and remove certain biases. For example, the average brightness of the training images may be learned as a bias by the network, changing the output when a new image is presented to the network with a different brightness level. Similar biases may stem from orientation, crop, contrast, hue, saturation, and/or other factors. In another example, the artificial data augmentation may include using identified and labelled images and randomly applying one or more functions to those images. These functions may change the aforementioned factors, thus artificially creating a dataset, which may span a larger variation of the factors. Since this may be done automatically to each image, some embodiments of training component 32 may apply this technique to an arbitrary subset of training images an arbitrary amount of times and thus create a large increase in training data. Typically, this augmentation is performed on a random number of images, e.g., by randomly applying one or more of the aforementioned functions. This may occur during the training phase of the neural network, and the artificially created images may be discarded immediately after their use.

In some embodiments, training component 32 may perform data augmentation, including random horizontal flipping, random vertical flipping, color blur, Gaussian blur, and/or random contrast adjustments. For example, during training, training component 32 may take one or more raw images (e.g., satellite or aerial imagery) and augment them at each step in the training to give the model similar but nevertheless different data to analyze. This activity may improve the training process, e.g., by giving the model a greater diversity of images. And the data augmentation may help teach the network desired invariance and robustness properties, e.g., when only few training samples are available.

Statistics on what kinds of functions are applied to certain numbers of images and the resulting changes in performance of the neural network between different training sessions may be recorded (e.g., in electronic storage 22), and the best performing collection may be used for the final product.

The prediction model may analyze its predictions against a reference set of data called the validation set. In some use cases, the reference outputs may be provided as input to the prediction models, which the prediction model may utilize to determine whether its predictions are accurate, to determine the level of accuracy or completeness with respect to the validation set data, or to make other determinations. Such determinations may be utilized by the prediction models to improve the accuracy or completeness of their predictions. In another use case, accuracy or completeness indications with respect to the prediction models' predictions may be provided to the prediction model, which, in turn, may utilize the accuracy or completeness indications to improve the accuracy or completeness of its predictions with respect to input images. For example, a labeled training set may enable model improvement. That is, the training model may use a validation set of data to iterate over model parameters until the point where it arrives at a final set of parameters/weights to use in the model.

In some embodiments, training component 32 may implement an algorithm for building and training one or more deep neural networks. A used model may follow this algorithm and already be trained on data. In some embodiments, training component 32 may train a deep learning model of the identified algorithm on training data 60-1 providing even more accuracy, after successful tests with these or other algorithms are performed and after the model is provided a large enough dataset.

In some embodiments, prediction component 34 may use a layered architecture for facilitating attribute detection and other classification, in accordance with one or more embodiments. This architecture may comprise a user layer, a computation layer, and an image data storage. The user layer may comprise an image classifier UI and RESTful application program interface (API). That is, the user layer may be implemented via a web service API that adheres, e.g., to the representational state transfer (REST) architectural constraints, resulting in the RESTful API. The user layer may be implemented with such tools as the Django web framework, the Flask micro-web framework, and the Python (e.g., PyTorch) programming language. As such, at least some of the operations of processor 20 may be developed using any suitable language, such as the Python language, as it facilitates several machine learning tools, solutions, and open source libraries.

The computation layer may comprise a preprocessing layer, a post-processing layer, and/or an evaluation layer. System 10's computation layer may be implemented via any cloud service (e.g., Amazon web services (AWS), Microsoft Azure, etc.), Ubuntu operating system, and Python. The image data storage may comprise any suitable data storage, such as a mongoDB, which is a cross-platform document-oriented database program, and/or Amazon's simple storage service (S3) of its AWS, which provides object storage through a web service interface. More specifically, the image data storage may be implemented via a structured query language (SQL) server and an intelligence tool. System 10 may be implemented via one or more other database management tools, such as the Pivotal Greenplum database.

A model implementing a neural network may be trained using training data obtained by training component 32 from training data 60-1 storage/database, demonstrable with respect to FIG. 1. This training data obtained from prediction database 60 of FIG. 1 may comprise hundreds, thousands, or even many millions of images. The data set may be split between training, validation, and test sets in any suitable fashion. For example, some embodiments may use about 60% or 80% of the images for training or validation, and the other about 40% or 20% may be used for validation or testing. In another example, training component 32 may randomly split the labelled images, the exact ratio of training versus test data varying throughout. When a satisfactory model is found, training component 32 may train it on 95% of the training data and validate it further on the remaining 5%.

The validation set may be a subset of the training data, which is kept hidden from the model to test accuracy of the model. The test set may be a dataset, which is new to the model to test accuracy of the model. The training data set used to train prediction model 60-2 may leverage, via training component 32, an SQL Server and a Pivotal Greenplum database for data storage and extraction purposes.

In some embodiments, information component 30 and/or training component 32 may be configured to obtain training images from any suitable source, via electronic storage 22, external resources 24, network 70, UI device(s) 18, a satellite database (e.g., DigitalGlobe), and/or directly from sensor(s) 50. In these embodiments, these components may be connected to network 70 (e.g., the Internet). The connection to network 70 may be wireless or wired.

In some embodiments, training component 32 may enable one or more prediction models to be trained. The training of the neural networks may be performed via several iterations. For each training iteration, a classification prediction (e.g., output of a layer) of the neural network(s) may be determined and compared to the corresponding, known classification. For example, an image known to depict a road type or other object type may be input, during the training or validation, into the neural network to determine whether the prediction model may properly predict the types' presence. As such, the neural network is configured to receive at least a portion of the training data as an input feature space. Once trained, the model(s) may be stored in database/storage 60-2 of prediction database 60, as shown in FIG. 1, and then used to classify samples of images based on visible attributes.

In some embodiments, prediction component 34 may generate a pixel map, within which geo-intelligence (GEOINT) features may be encoded. This generation exemplarily depicted in FIG. 2 may include an inferencing operation on a satellite or aerial image. The pixel map may exemplarily comprise binary values. A feature may be defined herein as a foundational GEOINT feature or a representation of a geographic or global feature that has at least a spatial representation (i.e., a shape) and a set of attributes. These features may take the form of maps, charts, or other data. In some embodiments, prediction component 34 may perform exploitation and analysis of imagery and geospatial information to describe, assess, and/or visually depict physical features and geographically referenced activities on the earth. Geospatial intelligence may comprise imagery, imagery intelligence, and/or geospatial information.

After prediction component 34 generates the pixel map for each image, raster phase component 36 may obtain the pixel map for vectorization. The vectorization may occur in two phases: a raster phase and a vector phase.

In the raster phase, an input image may be read, and a pixel map mask may be converted into rough, skeleton vectors. In the vector phase, a quality and shape of the vectors may be improved, and undesirable artifacts may be removed. The raster phase may comprise a set of operations, including reading a tile from an input image, morphological cleanup, skeletonization, truncating an overlap from the tile, vectorization, removing segments on right/bottom boundaries, smoothing, pre-generalization, and/or gathering vectors from all tiles. And the vector phase may comprise another set of operations, including creating a connectivity graph, cluster collapsing, gap jumping, spurs' removal, joining unnecessary graph splits, intersection (e.g., quad, T, circle, and/or another type of intersection) repair, post-generalization (e.g., vertex reduction), and/or transforming and outputting. The vector phase may improve quality and shape of the rough, skeleton vectors, and this phase may remove undesirable artifacts in individual or groups of interconnected vectors.

In some embodiments, information component 30 may download an area of interest (AOI) or entire satellite imagery (e.g., from a Digital Globe satellite database into storage 22) and then upload the AOI or the entire image into local GPUs (e.g., an NVIDIA DGX-1 server). Before the imagery is sent into a machine learning model, it may initially be divided into tiles which the model may fit in local memory. That is, due to memory constraints, the binary pixel map may be initially subdivided into (e.g., overlapping) tiles, and raster phase component 36 may act on these tiles. Overlapping tiles may be used instead of partitioned titles, e.g., to enhance the connection of road vectors that cross tile boundaries. For example, raster phase component 36 may use Rasterio and Geopandas to divide the imagery into 512×512 pixel tiles. This may result in a resolution of each tile or chip being about a city block.

In some embodiments, each machine learning model 60-2 may comprise a ResNet-101 CNN backbone. In these or other embodiments, the model may comprise a DeepLabV3 network head, which may be attached to the network and configured to produce the pixel maps (e.g., including a segmentation operation). There may be residual blocks in ResNet, which may help in training deeper networks. In some implementations, training a deeper residual network using a plain network may not increase training error, even after a certain time period. In some implementations, training component 32 may implement a ResNet to support training of very deep networks (e.g., hundreds of layers) by introducing a residual block that sums two signals: a non-linear transformation of the input and its identity mapping. The ResNet may be configured as a fully convolutional network.

After the imagery is divided into smaller tiles, prediction component 34 may pass them through model 60-2. The model's output may be a pixel map for each image. These pixel maps may each have same dimensions as the parent aerial image (e.g., when the tiles are stitched back together using Rasterio). Each pixel may be colored (e.g., white) where there are no roads present and colored differently (e.g., black) where there are roads present.

In some embodiments, prediction component 34 of FIG. 1 is configured to preprocess images. In some embodiments, prediction component 34 is configured to use the open source computer vision (OpenCV) library of programming functions and the Python image library (PIL). For example, a function from the OpenCV library selected for use as part of the disclosed approach may be directed to real-time computer vision. In some embodiments, a first feature is extracted by one or more functions of the OpenCV library. After pre-processing, a classifier could operate with respect to packages, e.g., running in Docker containers. Anaconda is an open source project that supports many libraries in the Python and R languages, for mathematical programming and statistical modeling.

Prediction component 34 may be configured to use the Keras, TensorFlow, PyTorch, MXNet, or Caffee neural network library. That is, at least one of the machine learning models may operate with an activation function from a neural network library, such as Keras, therefore operating with respect to Tensorflow as backend. In some embodiments, system 10 comprises deep neural network powered components (e.g., training component 32 and/or prediction component 34). In some embodiments, these components may be powered additionally or alternatively by one or more other types of neural networks, other types of prediction models, or other types of algorithms.

In some embodiments, the pixel map may be generated based on a classifier that implements at least one of a support vector machine (SVM), singular value decomposition (SVD), artificial neural network, deep neural network (DNN), recurrent neural network (RNN), CNN, densely connected convolutional networks (DenseNets), R-CNN, you only look once (YOLO), recurrent YOLO (ROLO), hidden Markov model (HMM), and Bayesian network (BN). In these or other embodiments, prediction component 34 may use a "U-NET" style architecture, a refined deep residual convolutional neural network (RDRCNN), and/or a Tiramisu architecture.

In some implementations, the RDRCNN may be implemented with a postprocessing stage. This approach may comprise a residual connected unit (RCU) and a dilated perception unit (DPU). The RDRCNN structure may be symmetric to generate outputs of a same size. A math morphology and a tensor voting algorithm may be used to improve RDRCNN performance during postprocessing.

In some implementations, prediction component 34 may use a Tiramisu architecture for semantic image segmentation, which is based on CNNs. This or another architecture may include a downsampling path (e.g., coarse semantic feature extraction), an upsampling path (e.g., input image resolution recovery at a model's output), and/or a post-processing module (e.g., conditional random fields) to refine the model predictions. In an exemplary implementation of DenseNets, each layer may be directly connected to every other layer in a feed-forward fashion, e.g., for improved accuracy and ease of training.

In some implementations, prediction component 34 may use a U-net, which comprises a CNN. The network may be based on a fully convolutional network, and its architecture may support fewer training images and greater segmentation precision. This approach may include successive convolutional layers, e.g., where pooling operations are replaced by up-sampling operators to increase output resolution.

In some embodiments, the object identification and/or the detection may be performed using at least one machine learning classifier or via deep learning. Some embodiments of attribute recognition component 34 may define attributes or regions, which may be classified (e.g., via a support vector machine (SVM) and a kernel based method). For example, some machine-learning implementations may include Viola-Jones object detection framework based on Haar features, scale-invariant feature transform (SIFT), and/or a histogram of oriented gradients (HOG). These or other embodiments of prediction component 34 may perform end-to-end object detection, without specifically defining the attributes, e.g., based on a CNN.

In some embodiments, prediction component 34 may cause implementation of deep learning, such as by at least one of a region-based CNN (R-CNN), a fast R-CNN, a faster R-CNN, and/or a mask R-CNN. The deep learning may be performed via one or more ANNs, e.g., where each ANN is used to predict one or more road attributes. Each ANN may be different. A mask R-CNN may be a fully convolutional head for predicting masks, which may resize the prediction and generate the mask. These region-based techniques may limit a classifier to the specific region. By contrast, a YOLO technique may access the whole image in predicting boundaries, and it may: (i) detect in real-time which objects are where; (ii) predict bounding boxes; and/or (iii) give a confidence score for each prediction of an object being in the bounding box and of a class of that object by dividing an image into a grid of bounding boxes; each grid cell may be evaluated to predict only one object. As such, YOLO may be used to build a CNN network to predict a tensor, wherein the bounding boxes or regions of interest (ROIs) are selected for each portion of the image. YOLO may predict faster than a mask R-CNN, but the mask R-CNN may make more precise predictions.

Prediction model 60-2 may include an input layer, one or more other layers, and an output layer. The one or more other layers may comprise a convolutional layer, an activation layer, and/or a pooling layer. The number and type of layers is not intended to be limiting. Artificial neurons may perform calculations using one or more parameters, and the various interconnecting lines of layer represent connections from the output of one neuron to the input of another. That is, the extracted features from multiple independent paths of attribute detectors may be combined. For example, their outputs may be fed as a single input vector to a fully connected neural network to produce a prediction of the road(s) present in an image.

In some embodiments, information component 30 may obtain imagery with shading or other form of coloring and/or intensity-adjustment. For example, a shaded region may encode a value, e.g., in a range between zero and one. In this example, one is the most confident and zero is the least confident (but the opposite may be true in another example). In this or another example, each pixel of the pixel maps may have a first color, e.g., when no road is present therein, and have a second, different color, e.g., when there is at least one road present therein. That is, in generating the binary pixel map, the neural network may be used to predict a confidence value for each pixel in the image. But there may be intermediate values in between at least two extremes, but prediction component 34 may remove or adjust each of the intermediate values to one of the extremes, as part of a herein-disclosed approach (e.g., via Otsu's dynamic thresholding method). These intermediate values may be undesirable artifacts from the model's predictions, a confidence value of which does not satisfy a criterion.

In some embodiments, prediction component 34 may obtain a grayscale image, e.g., of a building or road. This object may have a variety of pixel values (e.g., in a range from when the sun is more or most intense shining on the building to when there is an area of shadow). In one example, half of the image may be perfectly lit by sunlight, and the other half of it may be not perfectly lit by sunlight.

Figure 3:
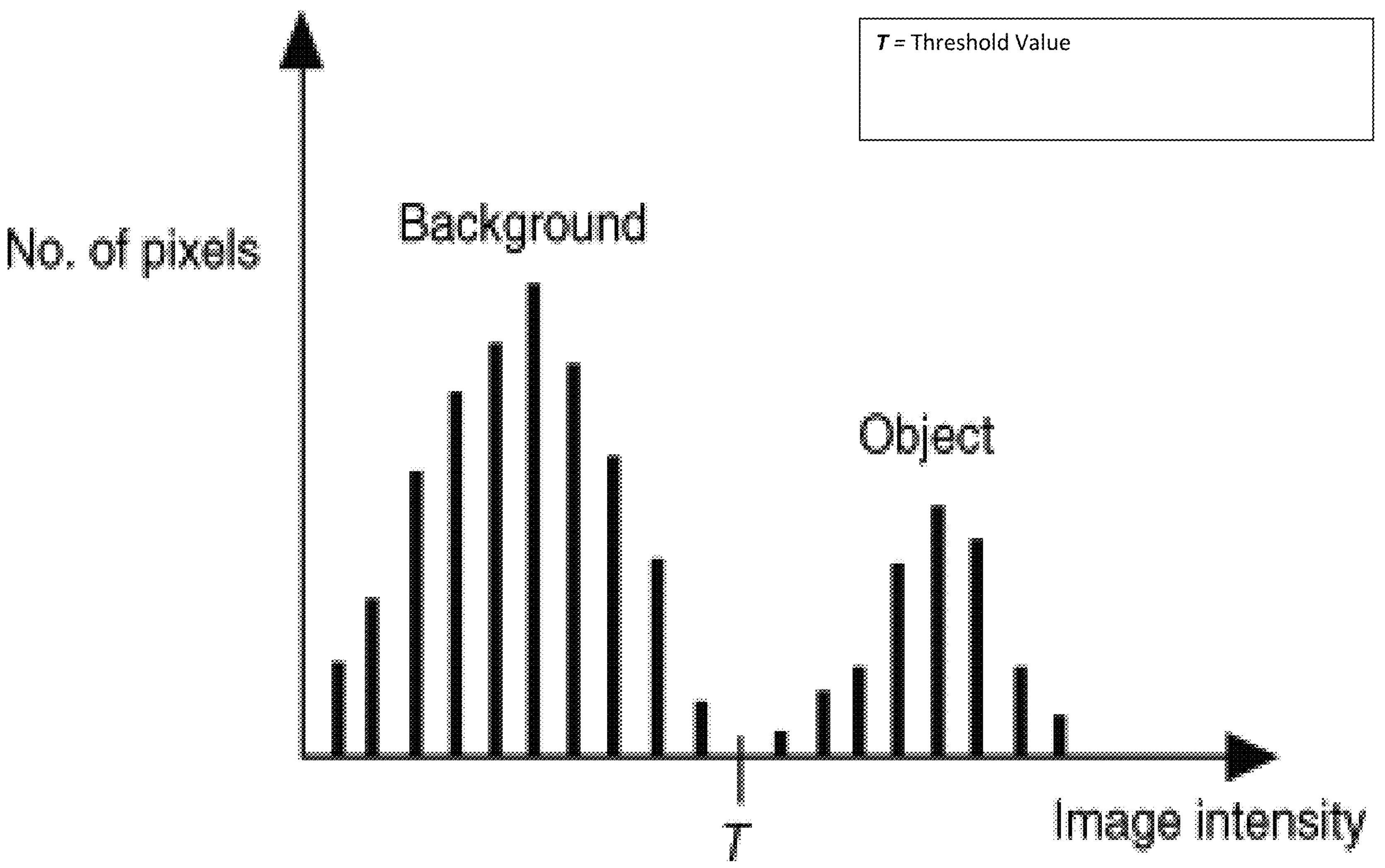
FIG. 3 illustrates a dynamic thresholding operation, in accordance with one or more embodiments.

In some embodiments, prediction component 34 may perform dynamical thresholding (e.g., Otsu's method) by taking all pixel values in the image and plotting on a histogram. See, e.g., FIG. 3 (depicting one exemplary histogram). An objective of this approach may be, starting with a histogram that has two peaks (as in FIG. 3, with one peak of values for indicating dark pixels values and another peak of values for indicating light pixel values), to determine which pixel value is the cutoff between the two peaks. That is, as depicted in FIG. 3, there may be a valley interposed between two peaks, one for the dark pixel values and the other for the light pixel values. And prediction component 34 may determine a middle of the valley, effectively cutting off the two peaks at one and returning the cutoff location.

For example, prediction component 34 may determine a cutoff point between not confident values and very confident values. In this example, prediction component 34 may then determine that (i) intermediate pixel values below the cutoff point are not a road, in setting the values to zero, and that (ii) intermediate pixel values at or above the cutoff point are a road, in setting the values to one. Prediction component 34 may then output a pixel map where there are no intermediate values, there being rather only binary values. This component may thus determine whether each pixel of the map belongs to an object of a same particular type.

This dynamic thresholding approach, e.g., using Otsu's thresholding method, may improve upon any known manual means. This is significant because humans are known to inaccurately guess/estimate the cutoff value. The herein-disclosed approach may not only be more accurate, reliable, and deterministic (i.e., than if otherwise performed by a human) but also more dynamic by being able to set different cutoff values for each image. As such, each pixel in the image may be given a confidence value as to whether or not that pixel is a road pixel.

Information component 30 may read an input tile from an image (e.g., a TIFF file). To support images that are too large to fit in memory, the image may be divided into a grid of tiles. Each tile may be read and processed independently to produce an initial set of vectors. An additional advantage of processing in tiles is that multiple tiles may be processed in parallel, using multiple CPU or GPU cores, reducing the overall time it takes to complete the process. Two steps, morphology and skeletonization, may produce incorrect results around the boundaries of their input—a tile. To correct these errors, the rectangular area to be read from the image for a tile may first be expanded on all four sides. Processing may continue on this larger, overlapped tile, and later the portion of expansion may be removed. A result may be that the error produced by morphology and skeletonization occurs outside the portion of the tile that is kept after truncation, and the resulting vectors from the tiles may merge together to form the same product as if the entire image had been processed without tiling.

In addition to the larger overlap added to a tile, which may later be completely removed, the tiles overlap by 1 pixel, which is not removed. In this way, the vectors which end on a tile boundary may have coincident endpoints with those of neighboring tiles, and may be trivially joined later.

In some embodiments, the raw pixel map may be noisy, e.g., with imperfectly straight lines, an imperfect block over where the road is located, some edges may be thicker than others, and the like. Raster phase component 36 may thus perform erosion to remove noise, effectively cleaning up those borders of the roads. For example, raster phase component 36 may remove small artifacts (e.g., tiny blobs of black in certain locations), which may be extraneous predictions.

Figure 4:
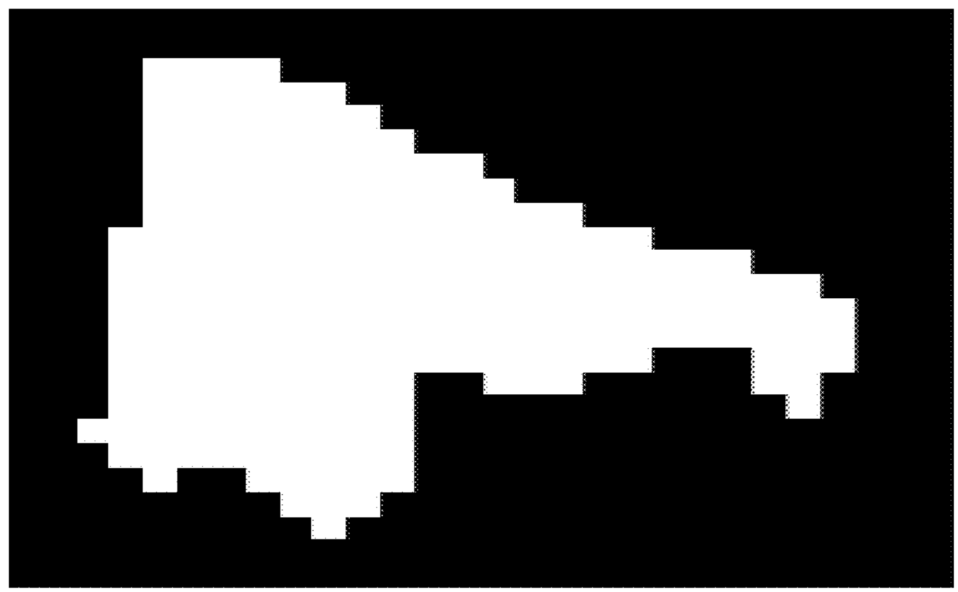
FIG. 4 illustrates a morphological cleanup operation, in accordance with one or more embodiments.
Figure 4:
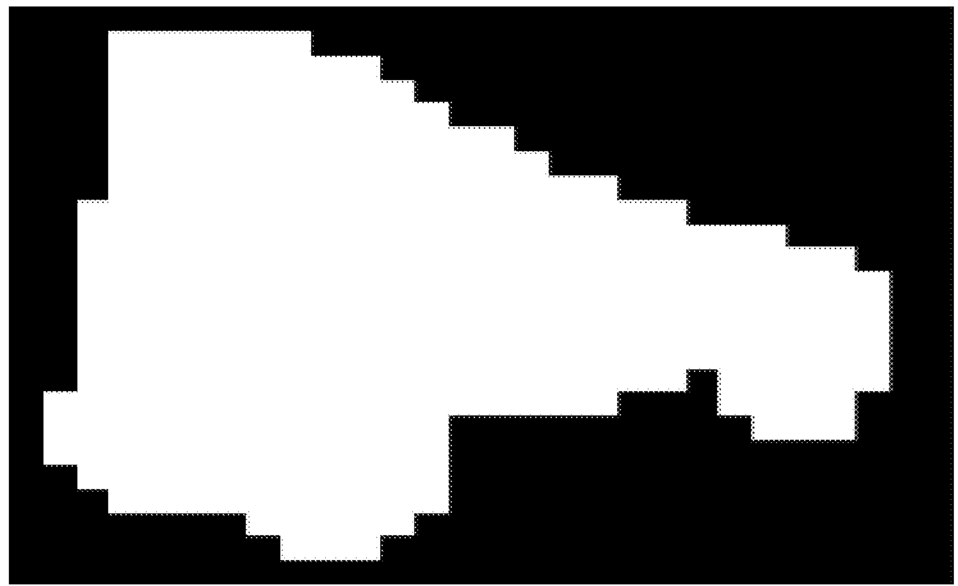

In some embodiments, raster phase component 36 may perform morphological cleanup and erosion to remove noise and small artifacts at the pixel map level. Via erosion, masks may be eroded to remove bulkiness and additional noise. FIG. 4 exemplarily depicts morphological cleanup, which may involve removing little, stand-alone blobs (i.e., extraneous predictions). Raster phase component 36 performing this cleanup may then output a pixel map having roads each with a certain thickness. To remove noise and small objects in the input image, a morphological erosion may thus performed. Optionally, a subsequent small morphological dilation, especially one with a round structuring element, may be helpful to reduce artifacts and small angle deviations near lines which dead-end.

In some embodiments, the Zhang-Suen algorithm may be used on a pixel map of roads having certain thicknesses. A blob may overlay a location of the road, which may complicate the intent to have vectors as straight lines and without any thickness variation. Raster phase component 36 may thus utilize the Zhang-Suen algorithm to collapse the road that has a thickness down to a single, one-pixel-wide line.

Figure 5:
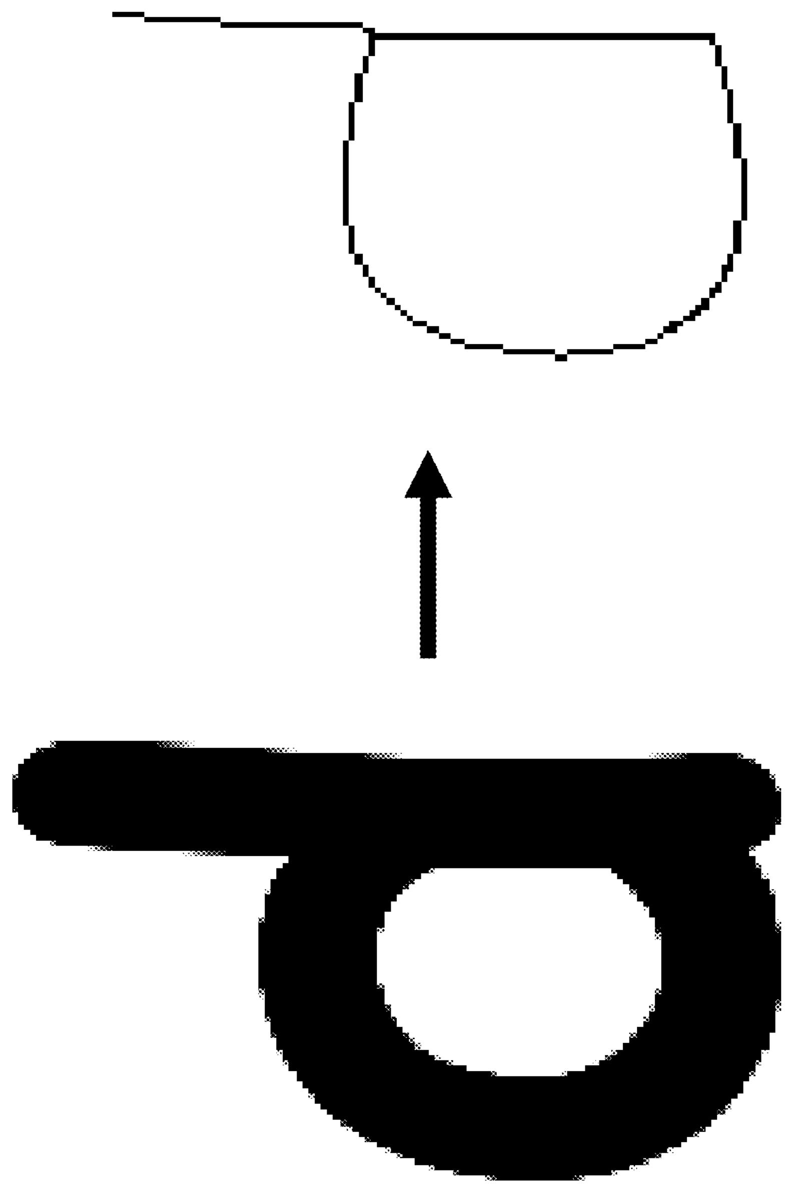
FIG. 5 illustrates a skeletonization operation, in accordance with one or more embodiments.

In some embodiments, raster phase component 36 may perform skeletonization, as exemplarily depicted in FIG. 5. For example, this component may employ the Zhang-Suen thinning algorithm to produce a pixel map, each road being one pixel thick. For example, a skeleton may be converted into vector form by first traversing a skeleton map to find road pixels.

Raster phase component 36 may, for each road pixel found, check neighboring pixels (e.g., all eight, including above, below, the two sides, and the four corners). If a neighbor is found, raster phase component 36 may extract a vector in a direction of the neighbor. Raster phase component 36 may perform the same for all other neighbors, and then join the vectors into one. A neighbor may be any pixel a certain (e.g., configurable or predetermined) distance away from a pixel under analysis; these pixels may belong to a same road network being drawn.

In some embodiments, raster phase component 36 may truncate an overlap from tile. At this point, the steps that require the expanded tile due to special cases at the boundaries have completed. The tiles may now be truncated, leaving a one-pixel overlap on the right and bottom sides.

When identifying all of the neighbors, raster phase component 36 may traverse the skeleton map to an intersection of two roads (e.g., one horizontal and the other vertical). More particularly, this component may traverse the skeleton map in the center of that intersection, i.e., where those horizontal and vertical roads meet. Neighboring vectors may be identified above, to the left, to the right, and below the intersection. Raster phase component 36 may then create a vector in each of those directions, the four separate vectors together representing that intersection.

In some embodiments, the skeleton may still be a binary image except where the roads are just thinned to a skeleton. Raster phase component 36 may identify all pixels in a line that have a same value, and then the mentioned traversal may include looping through each pixel value. For example, raster phase component 36 may obtain a first pixel having a value and X and Y coordinates on the image for that particular pixel value. Raster phase component 36 may then look at an adjacent pixel and pixels around it to determine whether this component needs to connect anything. Raster phase component 36 may then loop to a next pixel and repeat these operations.

The herein disclosed skeletonization operation may reduce thickness of roads to lines that is each one pixel thick. This operation is important because raster phase component 36 otherwise, with a pixel map that has several roads with a given thickness, cannot create vectors because said vectors need to be single lines each with two end points. In sum, the cleanup operation may remove blobs and/or other messy, undesirable artifacts present in the image, and the skeletonization then thins those lines down so that they may easily be turned into vectors.

This skeletonization may result in rough vectors. A result of this operation, though, may result in undesirable artifacts that may be removed in subsequent operations. For example, at an intersection or something like that, there may be little trees or edges off of the road that result from, e.g., ends of roads having a rounded edge. That is, the Zhang-Suen thinning algorithm may produce small one-pixel-wide objects like fingers that branch off the end of the road. To be clear, these fingers may not actually be part of the road so raster phase component 36 may remove these leftovers.

In some embodiments, raster phase component 36 may remove segments on right/bottom boundaries. Due to the one pixel overlap between tiles, segments in the vectors which run exactly along the right-most column or bottom-most row of pixels may be found in both tiles, which would make joining vectors across tiles more challenging. For this reason, such segments may be removed from the vectors. If such segments occur in the middle of a line, the line may be split in order to remove them.

In some embodiments, raster phase component 36 may perform a smoothing operation on newly produced vectors. This operation may be necessary, e.g., when the machine-learning model produces masks that waver on the order of 5-15 pixels in amplitude, i.e., from a theoretical centerline of the road; a method may be previously performed to produce road network centerline vectors from a binary image. Once the pixel maps are turned into vectors, raster phase component 36 may reduce noise such that the final vectors are not crooked. Raster phase component 36 may remove the crookedness of combined vectors. For example, the smoothing may comprise a low-pass filter type activity, which may reduce an amplitude of high frequency noise. It "smoothes" a line, but does not necessarily result in a completely straight line from start to end. In another example, raster phase component 36 may obtain jagged, wavy, and/or incomplete line segments and draw a continuous line from one end point (e.g., a beginning) to another end point (e.g., an ending), which may result in a series of straight lines instead of several messy segments.

In some embodiments, raster phase component 36 may perform pre-generalization. For example, the vertex density may be reduced using the Douglas-Peucker algorithm with a very small tolerance value—nominally one pixel. The purpose of this initial generalization step may be to only reduce vertex density and thus memory usage for the overall program. A later step may apply a larger, user-controlled tolerance value to generalize the shapes to a desired level.

In some embodiments, raster phase component 36 may gather vectors from all tiles to arrive at a set of rough vectors for the (e.g., whole) input image. All the vectors from all the separately processed tiles may be gathered into one set.

In some embodiments, vector phase component 38 may process together, in the vector phase, all vectors produced from the tiles. A connectivity graph may be created and utilized for all subsequent steps.

Figure 6:
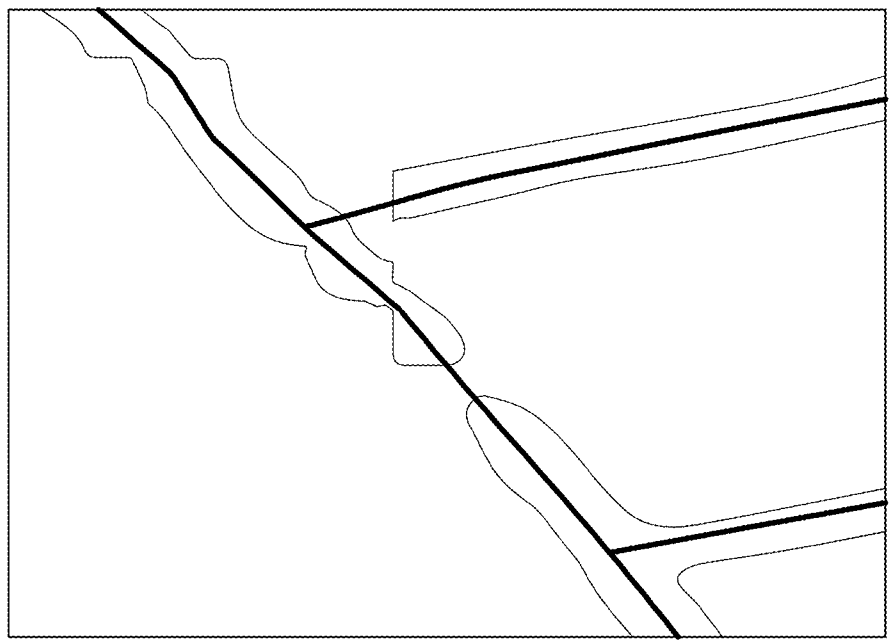
FIG. 6 illustrates a gap jumping operation, in accordance with one or more embodiments.
Figure 6:
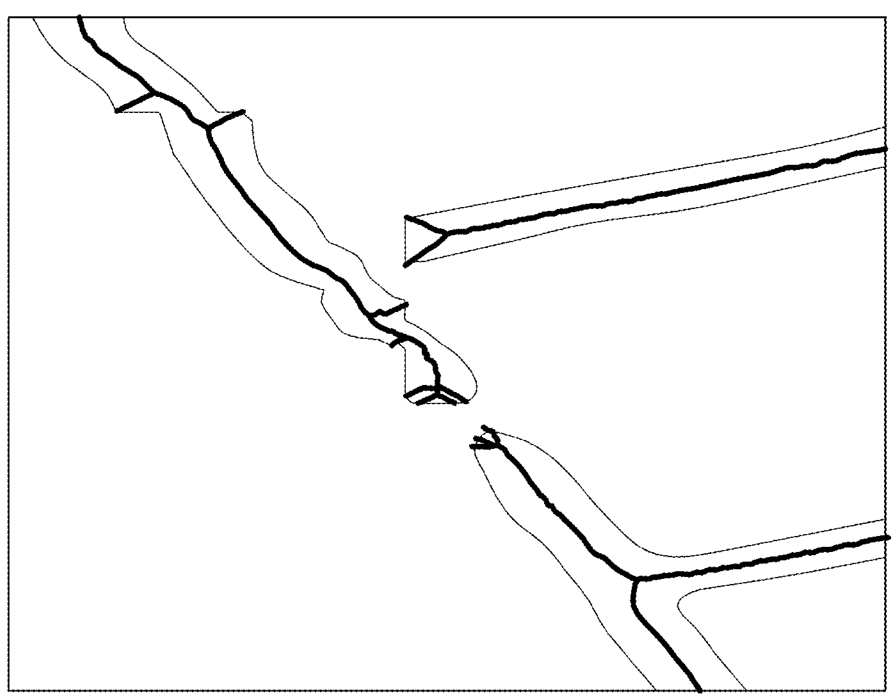

In some embodiments, vector phase component 38 may join unconnected roads that lie close to one another (e.g., by a configurable or predetermined distance). That is, with a connectivity graph indicating where all the roads are, vector phase component 38 may find where their most likely connecting points would be. Vector phase component 38 may thus perform gap jumping by identifying separate roads (e.g., separate from each other by a configurable or predetermined distance) and then jumping the gap between (i.e., connecting) these previously separate roads. Said gap jumping is exemplarily depicted in FIG. 6.

In some embodiments, vector phase component 38 may join unnecessary graph splits. For example, where lines join at tile boundaries, as well as where spurs have been removed, two lines may come in contact at their endpoints. These pairs of lines may be merged so subsequent steps may analyze road intersections and so that the final output does not have these superfluous splits.

In implementations where there is a messy intersection (e.g., with a bunch of roads that should share a common end point but do not), vector phase component 38 may make sure that all of those separate nodes of roads that should share a common end point now share a common end point, and then this component may fix roads that are not necessarily intersections but gaps between roads that should not be there. These gaps, which should not actually be there, may be referred to as dead ends. As such, vector phase component 38 may detect gaps by looking for dead ends in the connectivity graph. Spurs, which are also commonly produced by skeletonization (due to small blobs in the inference raster), are then removed altogether. Such spurs may be detected and removed by utilizing the connectivity graph to find dead ends in the line that are shorter than a threshold length, this threshold being configurable or predetermined.

Figure 7:
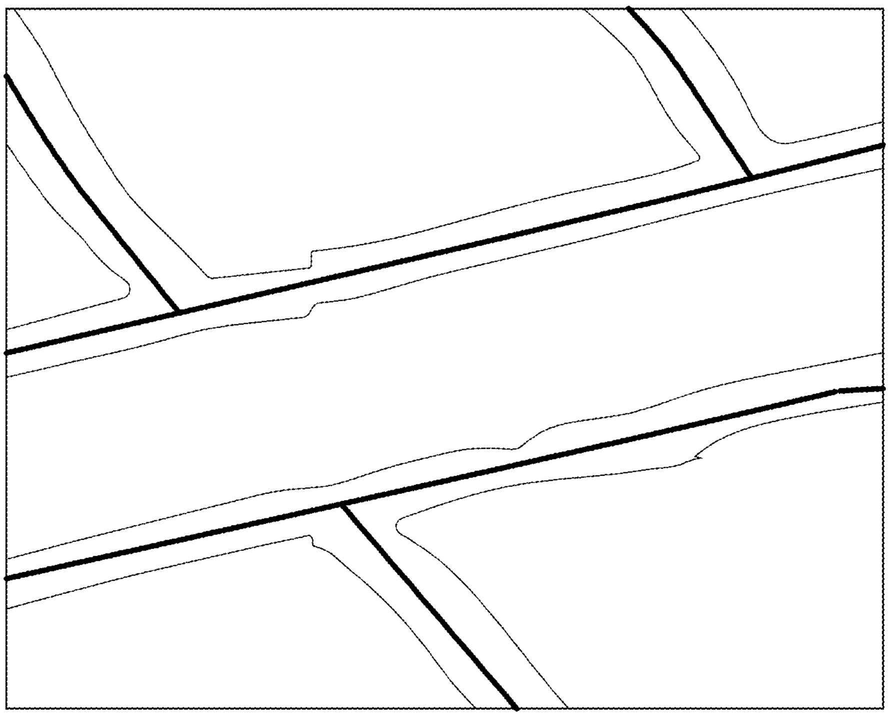
FIG. 7 illustrates a spur removal operation, in accordance with one or more embodiments.
Figure 7:
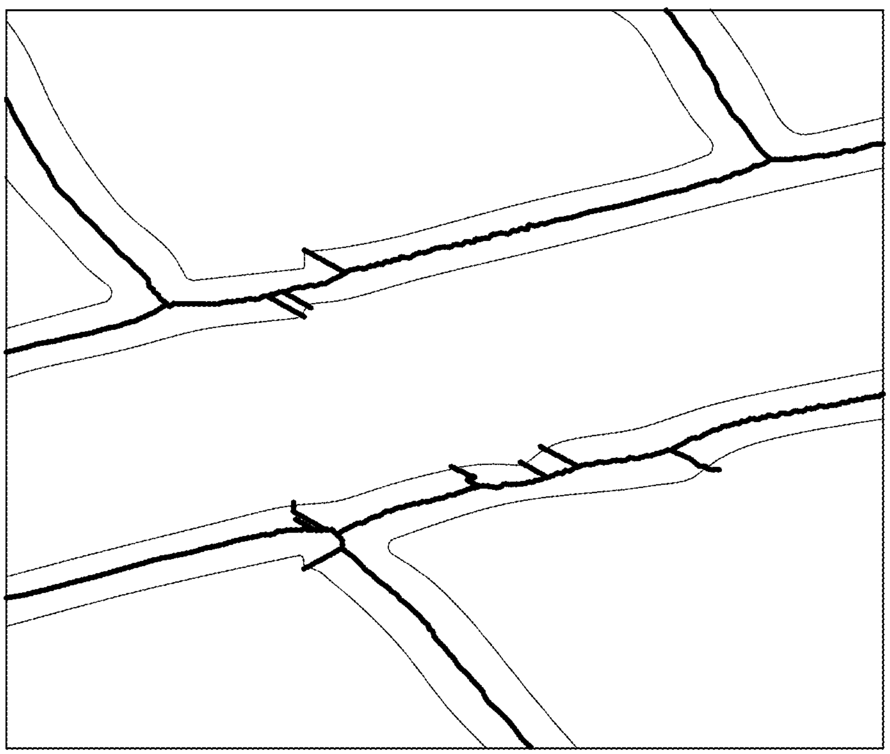

In some implementations, there may be, after skeletonization and smoothing operations, straight roads with artifacts jutting out like fingers or other lines at an end of that road where the dead end is. These fingers jutting or stretching out at the end of the road may not be separate roads that off shoot from the regular road. These undesirable spur artifacts may result from an initial road prediction having a certain thickness to it. Vector phase component 38 may clean off (e.g., by chopping, cutting, etc.) these spurs, as is exemplarily depicted in FIG. 7.

In some embodiments, after spur removal, vector phase component 38 may repair quad and T intersections. And this may be necessary because the aforementioned skeletonization may process a four-way intersection as two three-way intersections connected by a short link. This interpretation being undesirable, vector phase component 38 may detect these instances from the connectivity graph and subsequently collapse it to create a four-way intersection.

Figure 8A:
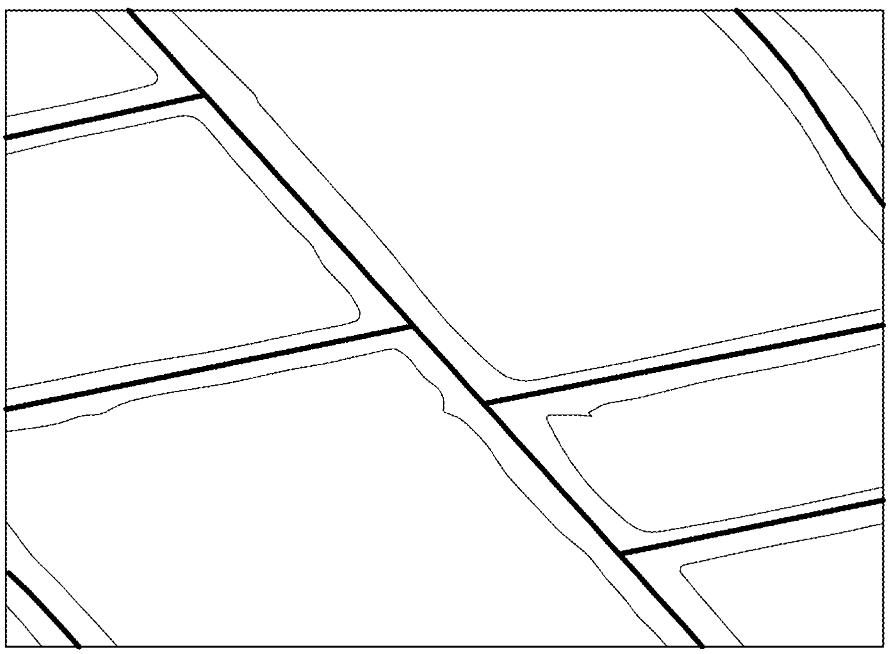
FIGS. 8A-8C illustrate intersection correction, in accordance with one or more embodiments.
Figure 8A:
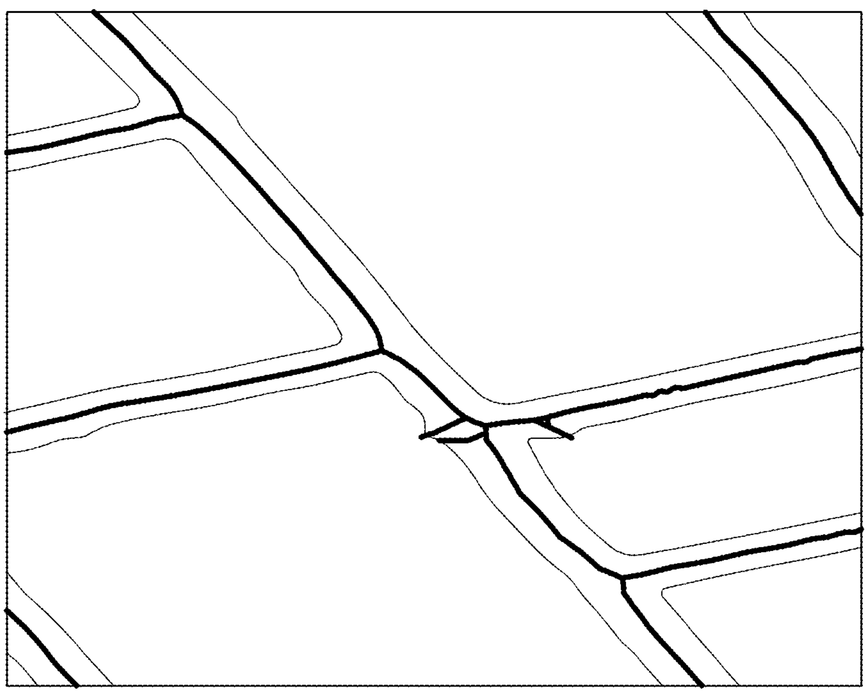

FIG. 8A exemplarily depicts T intersection repair. For example, when one road running horizontally intersects but does not pass through another running vertically, a T-shape is formed. The skeletonization algorithm, though, may produce a distortion in which the intersection vertex is pulled out of line with a through road along the axis of a terminating road. For example, in a T intersection of two curved roads, each having a certain thickness, there may be a little divot in that intersection. As mentioned, vector phase component 38 may use the connectivity graph to find these intersections. The small area near the faulty intersection may be ignored, and the angles of the lines which are left may be analyzed. Vector phase component 38 may then recognize that two of these three angles are colinear and place the modified intersection where the collinear pair and third roads meet. All three lines may then be modified to connect to this intersection. The colinear pair and third line may intersect (e.g., geometrically) at a point. That point may be calculated and used for the new/repaired (road) intersection location.

Figure 8B:
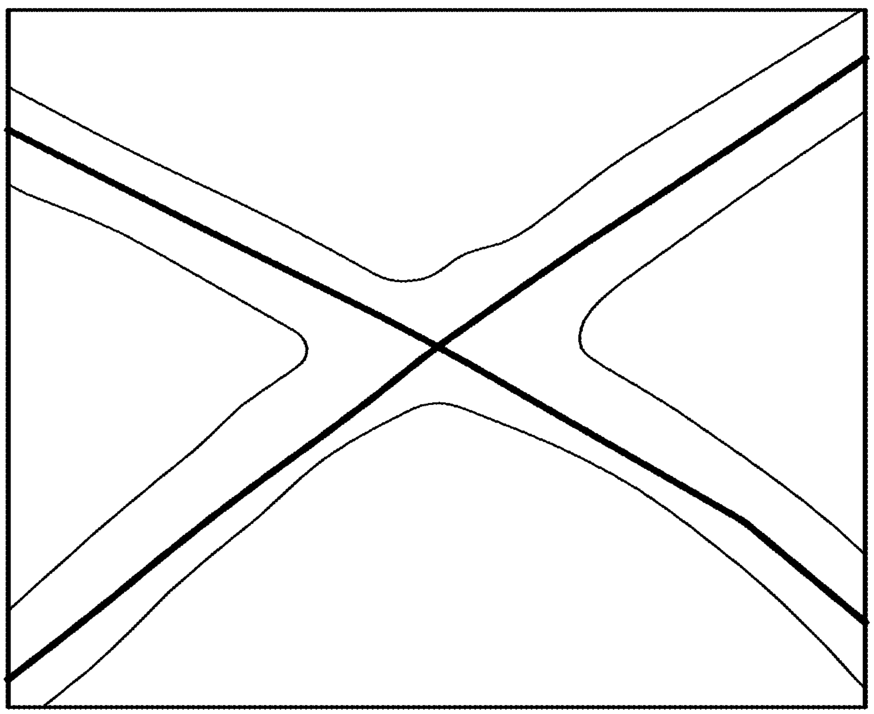
Figure 8B:
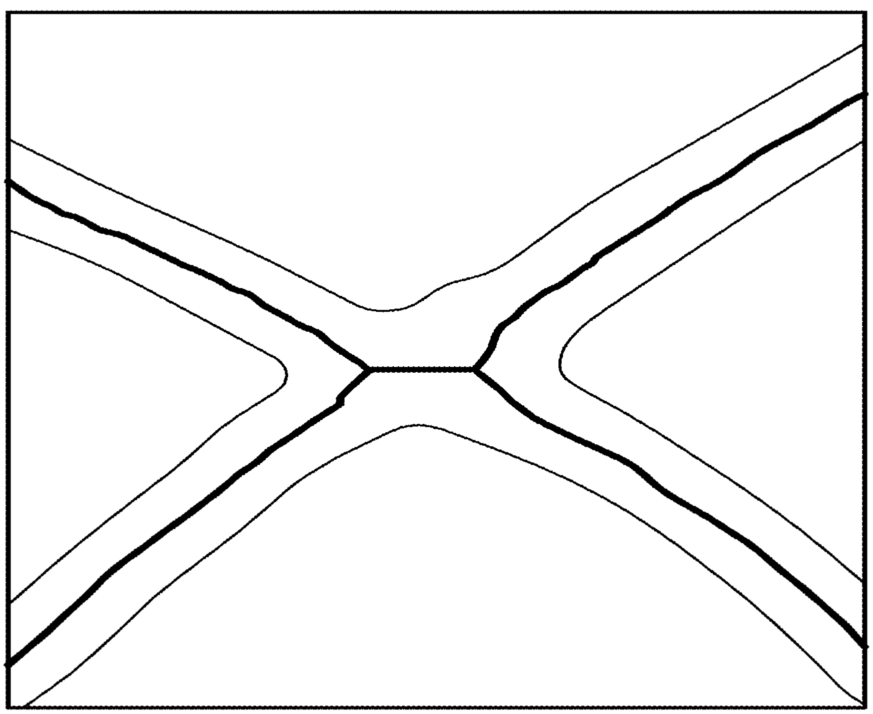

In some embodiments, vector phase component 38 may perform quad intersection repair. And this is because skeletonization algorithms often create two 3-way intersections with a small link segment between them, where a 4-way intersection may be suggested by a human viewing the mask. FIG. 8B depicts a typical skeletal structure produced at 4-way or quad intersections being repaired. The small segments may be undesirable, as is the misleading road connectivity and the resulting geometry. These areas may be detected using the graph structure to find short links which have two other neighbors at both endpoints. They may be collapsed into a 4-way intersection by removing the connecting line and adjusting the geometry of the remaining four lines to meet at a new common location. When some of the roads involved are part of parallel or dual carriageways, such as highways or roads with a median, vector phase component 38 may avoid collapsing the dual carriageways together into pinch points.

Figure 8C:
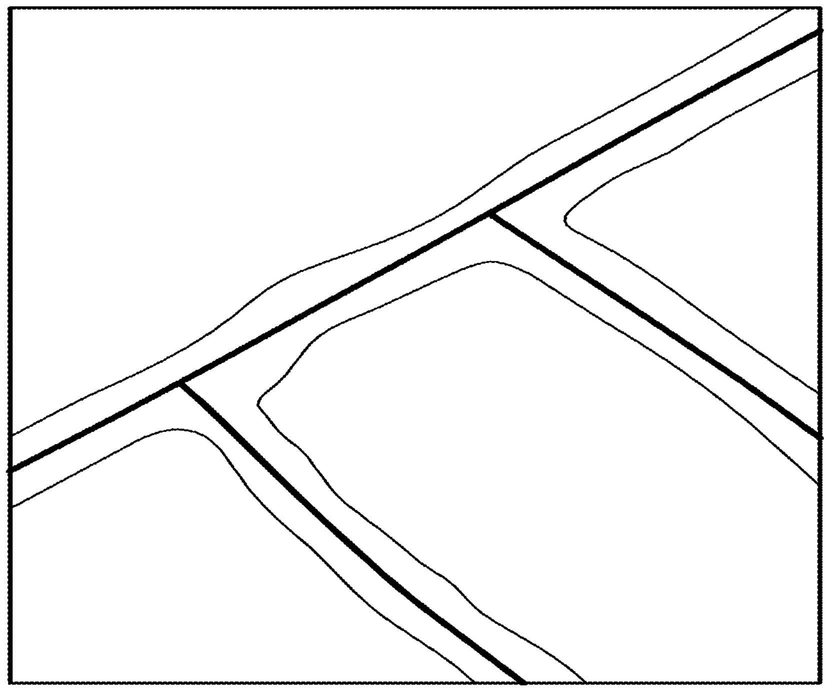
Figure 8C:
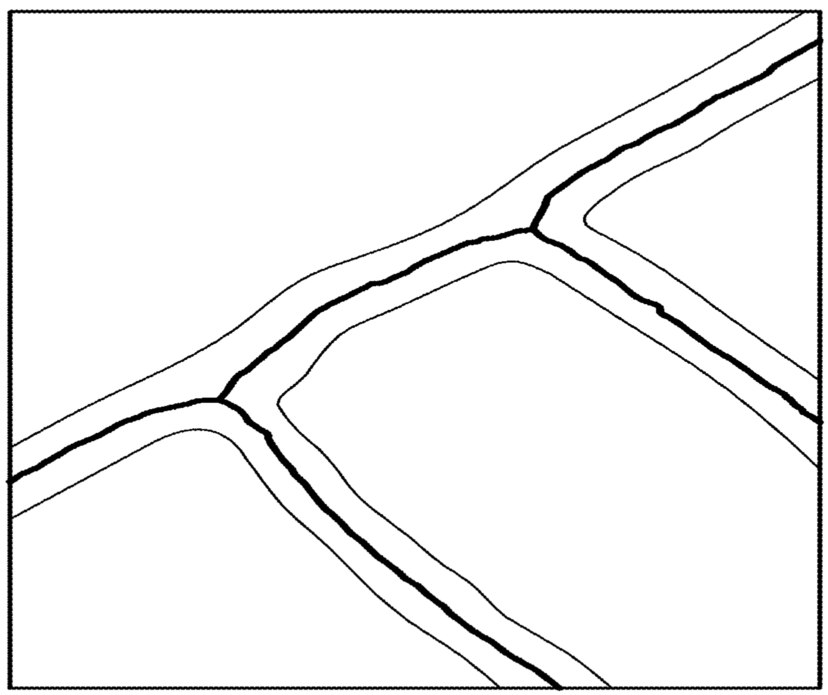

FIG. 8C depicts T-shaped intersections before and after their repair. Where three roads come together to form a T shape, the skeletonization algorithm tends to produce lines where the two straight roads are pulled toward the third. The amount of deviation from the expected centerline increases when the mask has a larger fillet, but occurs even when there is none. This deviation also causes a road to zig-zag when it has multiple T intersections on opposite sides—an artifact which may not be improved by a simplification algorithm such as Douglas-Peucker. A strong simplification step, such as Douglas-Peucker, may straighten these sections, but it may have several disadvantages, such as leaving the endpoints in place and moving the middle portions, which is the opposite of the correct behavior, and causing the lines to move away from the true centerline, zig-zags caused by opposing T's would not be corrected, and such a strong simplification would damage legitimate curves in roads. The graph may be utilized to find 3-way intersections. A portion near the intersection on all three lines may be ignored, to avoid being influenced by the problem bends, and a trending vector of each line approaching the intersection may be taken from the remaining ending portion. The trending vectors may be analyzed to detect if any two appear to be roughly collinear. If it is determined that an intersection should be a T intersection, then a new intersection may be calculated where the two nearly collinear and third vectors meet. All three lines may then be modified to remove a portion near the end and replace with a straight segment to the newly calculated intersection point.

In some embodiments, vector phase component 38 may obtain all vectors (e.g., the rough vectors output from the smoothing operation) and add them to a connectivity graph. For example, roads which intersect may be quickly discovered, and their shapes may be analyzed and manipulated together. In some implementations, the connectivity graph may be a graph of the locations of the roads and also a graph containing nodes, each of which being a connectivity point between those roads. Using the connectivity graph, vector phase component 38 may quickly determine which roads have common connection points. Vector phase component 38 may then provide all roads that share that connection point, e.g., for fixing intersections, fixing shapes of intersections, and the like. As such, vector phase component 38 may quickly reference the roads to then clean the vectors. And, after a connectivity graph is created, clusters of two or more nodes (i.e., endpoints) that are closer than a certain, small tolerance (e.g., 5 pixels) may be collapsed together to remove short lines. Vector phase component 38 may thus remove dense areas of geometry that mesh together.

In one example, there may be several roads that do not share the same node but that are known to share a same node. Vector phase component 38 may set a closeness tolerance value to a certain number of pixels, and this component may determine that separate nodes that are located within this threshold (e.g., five pixels) may be combined into one node. For example, there may be several roads that share a common node that should be connected yet, after the skeletonization operation, they are not connected by a common node. Vector phase component 38 may then determine that these nodes should actually be just one node; afterwards, this component may connect all of those roads together into the one node.

Figure 9A:
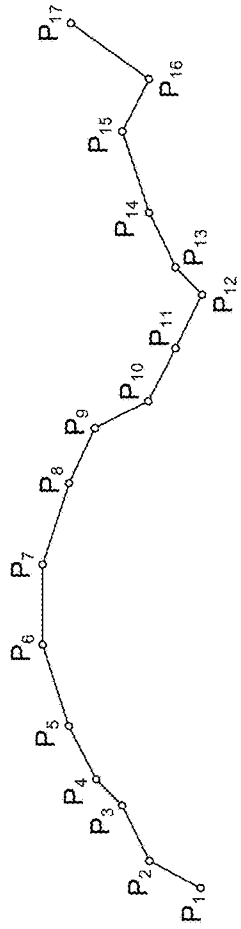
FIGS. 9A-9E illustrate implementation of the Douglas Peucker algorithm, in accordance with one or more embodiments.
Figure 9B:
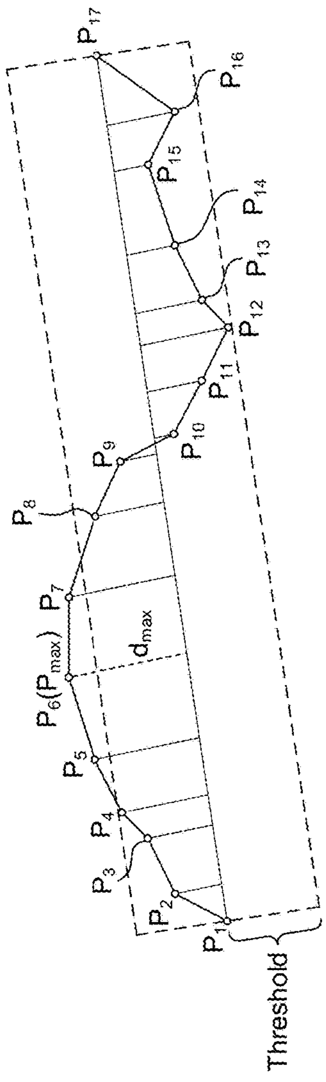
Figure 9C:
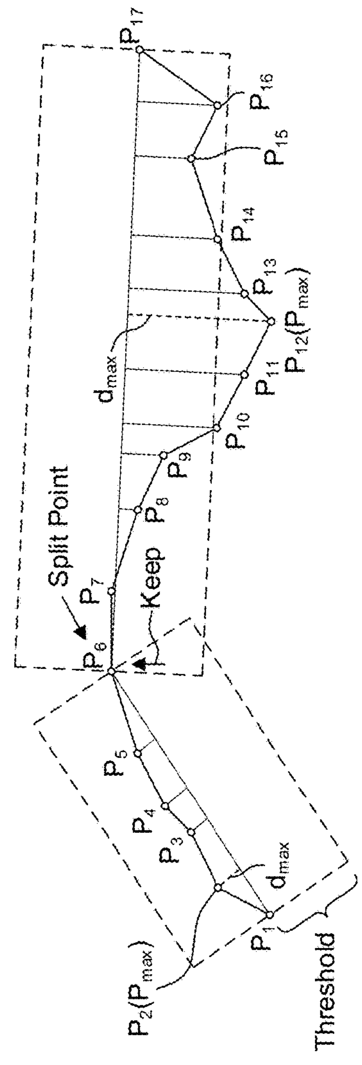
Figure 9D:
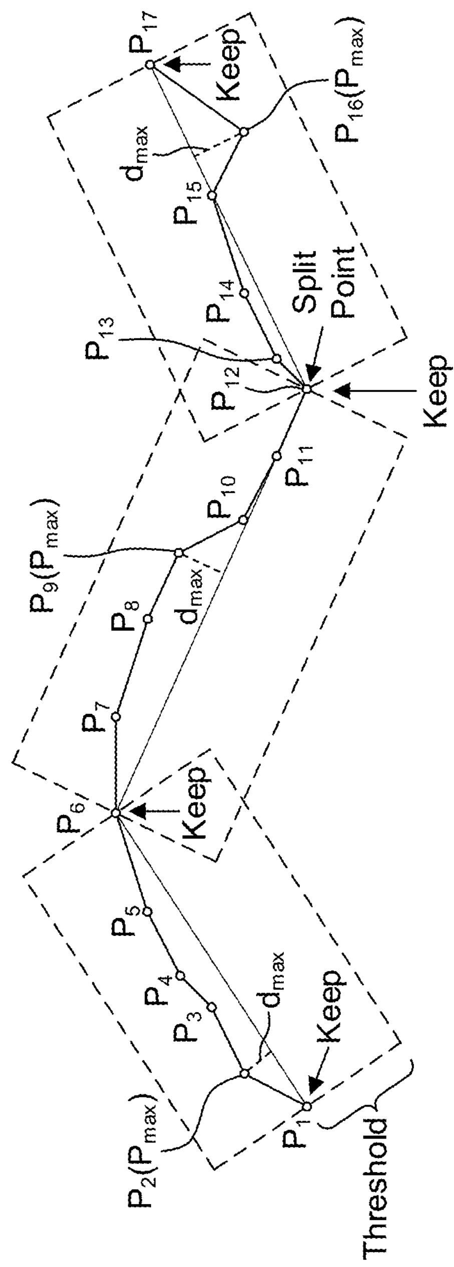
Figure 9E:
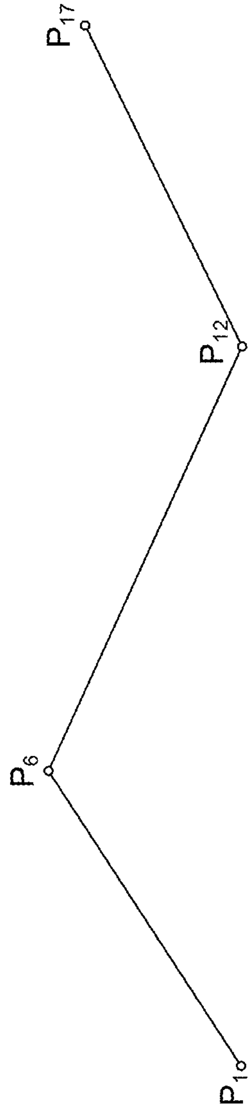

FIGS. 9A-9E exemplarily depict aspects of vector phase component 38's implementation of the Douglas Peucker algorithm, including: obtaining a trajectory, in FIG. 9A; finding the farthest point, in FIG. 9B; judging and splitting, in FIG. 9C; judging and retaining, in FIG. 9D; and obtaining a simplified trajectory, in FIG. 9E. Once the intersections are repaired, vector phase component 38 may process the lines with the Douglas-Peucker algorithm to reduce the vertex count. The baseline vertex density for the road labels may be tied to the image resolution; while high vertex density is useful to approximate curved roads, it may be unnecessary for linear road networks. This activity thus produces vectors with a controlled vertex density.

The (Ramer) Douglas-Peucker algorithm is known as the iterative end-point fit algorithm, and it may decimate or resample a curve comprised of line segments, e.g., to find a similar curve with fewer points. Dissimilarity may be based on a maximum distance between an original curve and a simplified curve (e.g., the Hausdorff distance between the curves, but any other suitable distance-determining means is contemplated). The simplified curve may comprise a subset of points that define the original curve. The original curve may comprise an ordered set of points or lines. The Douglas-Peucker algorithm may involve recursively dividing the line and marking first and last points to be kept.

In some embodiments, vector phase component 38 may reduce a number of points in a curve that is approximated by a series of points, e.g., by "thinking" of a line between the first and last point in a set of points that form the curve. Vector phase component 38 may check which point in between is farthest away from this line. If the point is closer than a certain distance, vector phase component 38 may remove all points in-between. But if an outlier point is farther away from, the curve may be split.

In some embodiments, information component 30 may be configured to store, in a certain file type, improved vectors such that a particular software application or class of applications is operable to edit a map or its one or more objects, e.g., of a particular type. The one or more objects may be represented by at least one of the vectors. By converting the pixel map to vectors, a user may be able to freely manipulate the geometry in GIS software. Moreover, a government contract may require files to be of the particular type (e.g., geometry, geodatabase, shapefile, geoJSON, or another file type), for subsequent editing and any post-processing. For example, road vectors may be subsequently compiled to create maps. That is, the geometry file may be used to create the map, which may be an objective of the vectors' collection.

In some embodiments, the certain file type may comprise a main file, an index file, and/or a dBASE table. These components may describe a shape with (e.g., a list of) vertices. There may be a relationship between geometry and feature attributes. Record contents of a shape file may comprise a shape type followed by geometric data for the shape. By looking at the file of this certain type, a user may see what type of feature and object is. For example, objects in a shapefile format may be spatially described vector features, such as coordinates associated with each of points, lines, and polygons, each of which potentially representing a different type of object. For example, a user may determine the type of road, e.g. whether it is a hard paved asphalt surface, concrete, a dirt road, etc. A file of this certain type may thus comprise a list or table of starting and ending points, each object instance being in a coordinate system (e.g., based on X and Y axes or any other set of axes).

Upon conversion of the pixel map into vectors, via the raster and vector phases, the vectors may then be transformed from pixel-space into a coordinate system of the input image. This transformation may be performed using associated georeferencing information. For example, the parent satellite imagery may be passed in as GeoTIFF files, which may include the necessary transformation parameters. Information component 30 may then write an output of this activity to an environmental systems research institute (ESRI) shapefile. The roads, which may be stored as geospatial vector data, may now be able to be viewed and edited in GIS software (e.g. ArcGIS).

In some embodiments, processor(s) 20 may be used to add support for feature attribution and collection of other features (e.g., buildings rather than roads). This feature attribution may result in identifying specific types of roads. For example, rather than merely collecting roads and identifying them as roads, the inventors have contemplated identifying other aspects, such as the width of the particular road and identifying what type of road it is (e.g., paved or unpaved, etc.).

Figure 10:
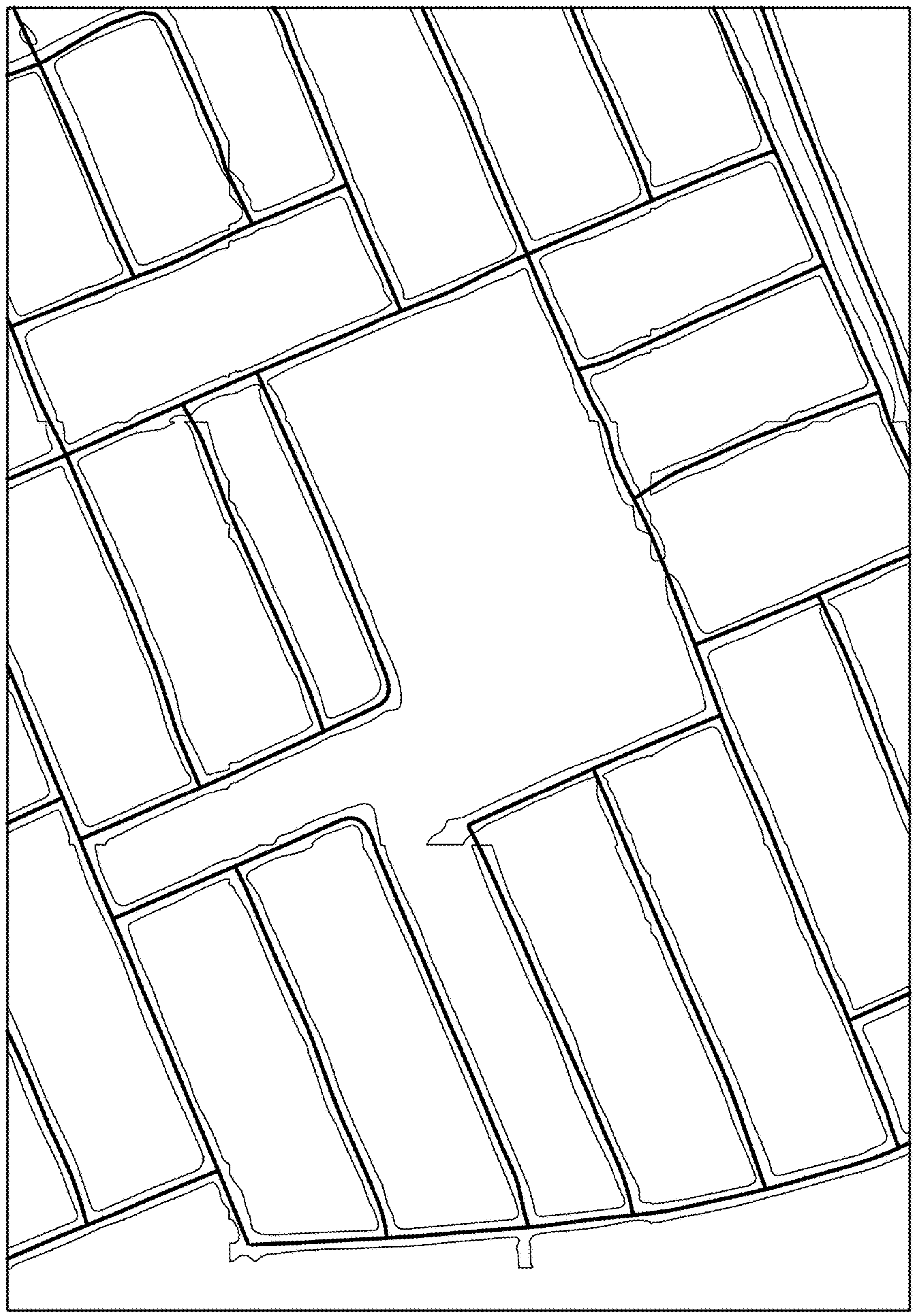
FIG. 10 depicts a vector representation of a processed road network, in accordance with one or more embodiments.

Known means may read an image comprising a binary mask and output a dataset of centerlines for the roads represented by the mask. Creating such centerlines would result in geometry and road networks with poor quality. By contrast, the disclosed approach addresses several such issues to produce a substantially higher quality, e.g., compared to what a human would create manually given the same input. FIG. 10 depicts several such improved roads. As in FIGS. 6-8C, FIG. 10 depicts road-representing vectors generated by vector phase component 38, each of these vectorized roads being depicted surrounded by an input binary mask.

Figure 11:
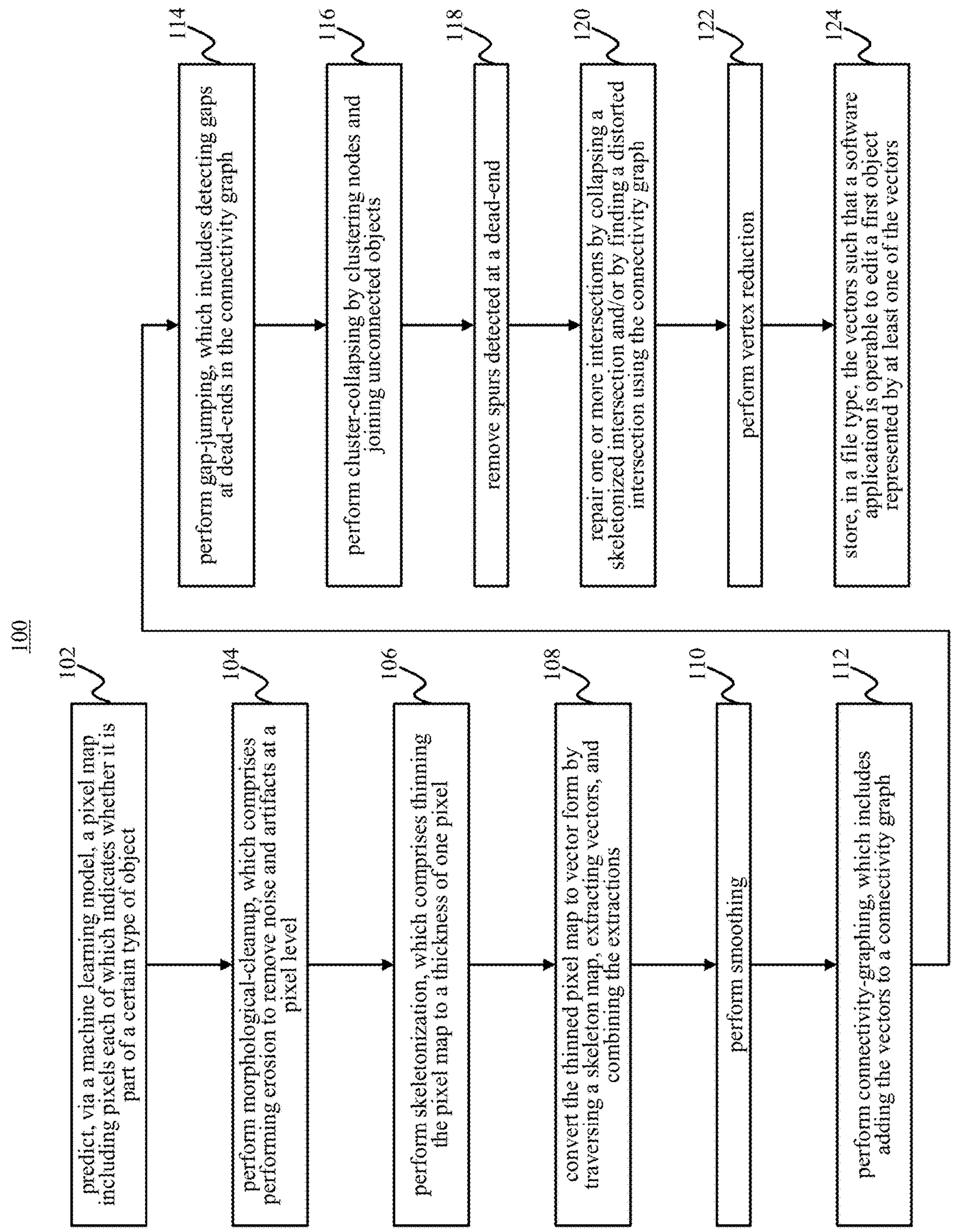
FIG. 11 illustrates a process for collecting feature vectors for particular objects from imagery, in accordance with one or more embodiments.
Figure 12:
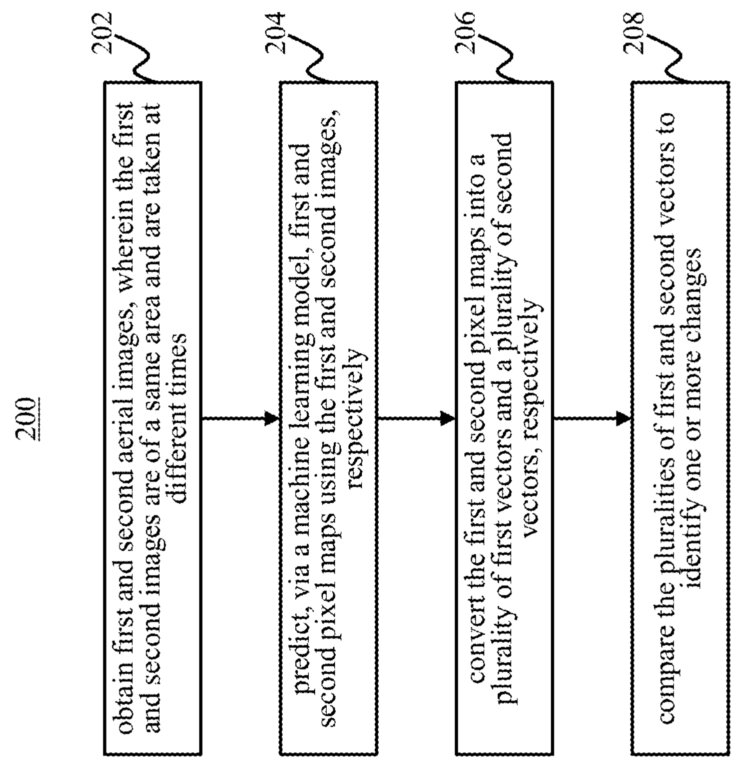
FIG. 12 illustrates a process for detecting imagery changes, in accordance with one or more embodiments.
Figure 13:
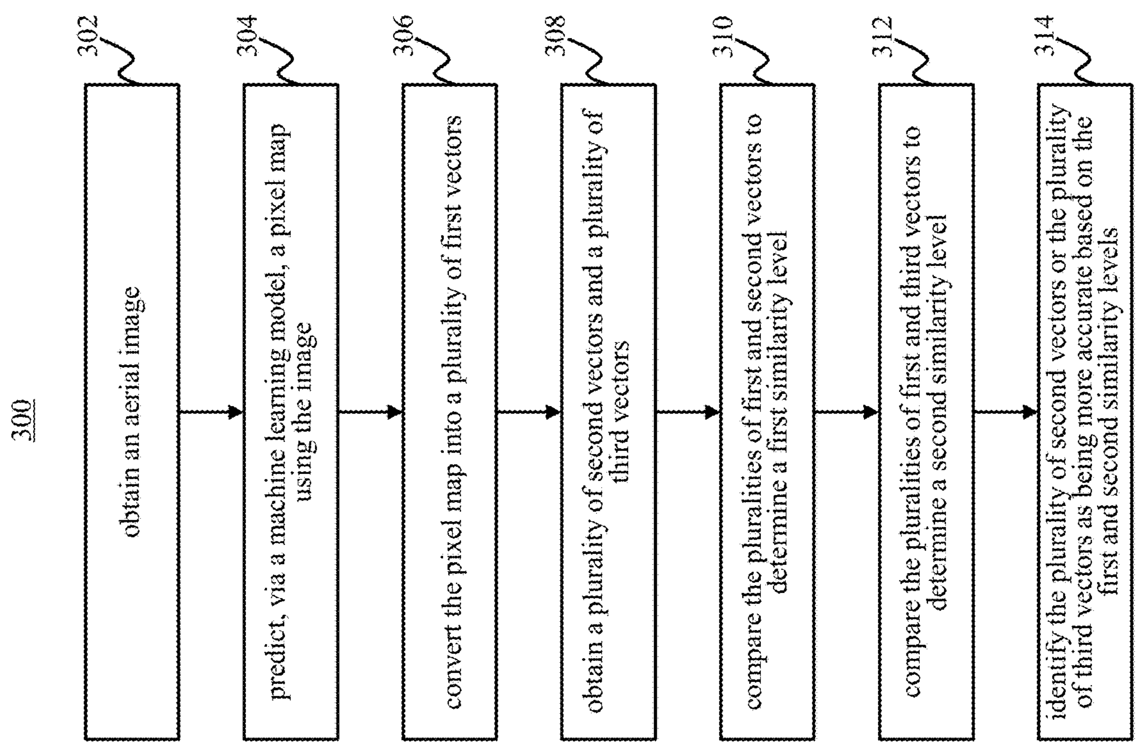
FIG. 13 illustrates a process for conflating vector data sources, in accordance with one or more embodiments.

FIG. 11 illustrates method 100 for collecting feature vectors from imagery. FIG. 12 illustrates method 200 for detecting changes in imagery. And FIG. 13 illustrates method 300 for evaluating source conflation. Each of methods 100, 200, and 300 may be performed with a computer system comprising one or more computer processors and/or other components. The processors are configured by machine readable instructions to execute computer program components. The operations of methods 100, 200, and 300 presented below are intended to be illustrative. In some embodiments, methods 100, 200, and 300 may be accomplished with one or more additional operations not described, and/or without one or more of the operations discussed. Additionally, the order in which the operations of methods 100, 200, and 300 are illustrated in FIGS. 11-13 and described below is not intended to be limiting. In some embodiments, methods 100, 200, and 300 may each be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of methods 100, 200, and 300 in response to instructions stored electronically on an electronic storage medium. The processing devices may include one or more devices configured through hardware, firmware, and/or software to be specifically designed for execution of one or more of the operations of methods 100, 200, and 300.

At operation 102 of method 100, a pixel map may be predicted, via a machine learning model. The pixel map may include pixels, each of which indicating whether it is part of a certain type of object (e.g., a road). More particularly, thresholding may be performed to obtain an image output (e.g., a pixel map) that has a binary value assigned to each pixel. Each pixel with a binary value may indicate, e.g., whether the pixel forms part of a particular object type (e.g., road, building, etc.). As an example, the initial layers of a CNN (e.g., convolutional layer, activation, pooling) may be used to recognize image features. The CNN may be obtained from models 60-2 of FIG. 1. That is, after training component 32 trains the neural networks, the resulting trained models may be stored in models 60-2 storage/database. As an aside, models 60-2 may further contain one or more other neural networks that are trained, obtained, and used. Some implementations of system 10 may obtain a different model for a plurality of different attributes to be detected. Image features of the image may be determined by using the obtained ANN (e.g., the CNN). Image feature values may represent visual features of one or more aspects of the image. A feature may be an interesting part of an image. For example, features or patterns may be one or more of textures, edges, corners, regions, shadings, shapes, ridges, straight lines, crosses, T-junctions, Y-junctions, or other characteristics of the image. Some embodiments may only examine the image in the region of the features whereas others may examine all pixels of the image. In some embodiments, operation 102 is performed by a processor component the same as or similar to information component 30, training component 32, and prediction component 34 (shown in FIG. 1 and described herein).

At operation 104 of method 100, morphological cleanup may be performed. After a neural network is utilized to perform predictions and after thresholding is performed to any intermediate values, morphological cleanup may be performed. Operation 104 may comprise performing erosion to remove noise and artifacts at a pixel level. As an example, since natural images are sometimes degraded by noise or other distortions, the preprocessing may first remove at least some of the distortion based on any suitable noise removal algorithm. Then, the preprocessing may pull from a library (e.g., OpenCV) such functions as thickness erosion, thickness dilation, opening, closing, morphological gradient, top hat, black hat, and other morphological operations. In operation 104, some embodiments may identify the element(s) by adjusting contrast in and around the one or more elements. The adjusted contrast may be based on analysis of a color, lightness, or shading in and/or around the one or more elements. This operation may be based on an assumption that color or intensity changes sharply on the boundary between different objects. The disclosed deep neural networks may learn hierarchical feature representations in their multiple-layer structure. By adopting CNN, the disclosed edge detection system may be free from extra feature extraction or multiple channel computation, thus being straightforward and efficient. On the other hand, the CNN may capture local patterns from images in its convolutional layers for edge detection. In some embodiments, operation 104 is performed by a processor component the same as or similar to raster phase component 36 (shown in FIG. 1 and described herein).

At operation 106 of method 100, skeletonization may be performed. This operation may comprise thinning the pixel map to a thickness of one pixel. For example, the mask may be thinned with the Zhang-Suen thinning algorithm. This may produce a raster, which comprises a one-pixel-thick skeleton roughly down the middle of roads in the mask. While this may form the basis of the road vectors, there are several undesirable geometrical artifacts that may be cleaned up in later operations. In some embodiments, operation 106 is performed by a processor component the same as or similar to raster phase component 36 (shown in FIG. 1 and described herein).

At operation 108 of method 100, the thinned pixel map may be converted to vector form by traversing a skeleton map, extracting vectors, and combining the extractions. As an example, a skeleton map may be traversed to find one or more neighboring pixels (which represent one or more objects of a same type as the object of interest), within a predetermined pixel distance. A vector may be extracted in a direction of each of the one or more found pixels. And the one or more extracted vectors may be combined. As such, the skeleton may be algorithmically converted from its raster mask form to a vector form. The skeleton mask may be traversed to find non-zero pixels. For example, for each non-zero pixel, its eight neighboring pixels may be checked to find those that are also non-zero. However, diagonal neighbors may be ignored if either of its adjacent horizontal or vertical neighbors are non-zero. In this way, stair-step shapes and compound intersections in the mask may be converted without producing many intersections and one-pixel-long lines. If no "on" neighbors are found, the original pixel may be ignored. If one neighbor is found, a vector may be extracted by following the mask in that direction using the algorithm described below. If two neighbors are found, then the original pixel may be in the middle of a single line, so a vector is extracted in the direction of one neighbor, another is extracted in the direction of the other neighbor, then the two lines are joined into one. If three or more neighbors are found, then all of them may be followed separately to produce individual lines. Neighboring pixels which have already been visited may be skipped because the lines have been followed. When following a line, neighbors may be assessed in the same way as before. The "on" neighbors may be followed in sequence to produce a line until either no further neighbors are found, or until more than one neighbor is found, indicating that the end of the line or an intersection has been reached. This may produce lines with a very high vertex density; one vertex per pixel in the input image. In some embodiments, operation 108 is performed by a processor component the same as or similar to raster phase component 36 (shown in FIG. 1 and described herein).

At operation 110 of method 100, smoothing may be performed. As an example, crookedness may be removed. Smoothing of the vectors may be performed for two reasons. The first may be to improve road shape by removing wavering shape noise. The second may be to prepare the line for generalization to reduce the vertex density. A triangle weighted average filter may be applied. It may be important that endpoints of lines not be moved. To accomplish this and maintain curve continuity along the entire line, all vertices may be mirrored across each endpoint to extend the line at both ends. This may give the weighted average data to work with as it approaches the endpoints and maintains the characteristic curves throughout. In some embodiments, operation 110 is performed by a processor component the same as or similar to raster phase component 36 (shown in FIG. 1 and described herein).

At operation 112 of method 100, connectivity-graphing may be performed. This operation may comprise adding the second vectors to a connectivity graph. For example, all vectors may be added to a connectivity graph, where the line-strings are the "edges" of the graph, and their endpoints are the "nodes." This way, roads that intersect may be quickly discovered, and their shapes may be analyzed and manipulated together. The following operations may be performed on the graph: whole line-strings may be added and removed, the graph may be queried to find all line-strings that have an endpoint at the query point, all line-strings may be iterated, and all endpoints may be iterated. In some embodiments, operation 112 is performed by a processor component the same as or similar to vector phase component 38 (shown in FIG. 1 and described herein).

At operation 114 of method 100, gap jumping may be performed. This operation may comprise detecting gaps at dead-ends in the connectivity graph. The input image may have gaps in blobs that represent roads, and consequently the vectors may also have gaps. This operation may include detecting gaps by looking for dead-ends and then attempting to find another road within a certain distance "forward" along the direction of the line where it ends. Initially, all lines in the graph are iterated to find ends that do not have any adjoining neighbors. The trending angle of the line as it approaches that endpoint may be analyzed to determine the approximate direction that should be used to find a target. A cell-based spatial index may be used to find lines in the search area. There may be multiple candidates in the search area. The best of them may thus be chosen by measuring jump distance, the angles formed by the jump and the original trending angle of the line, and whether there are any other lines in the vicinity to which the jump may come too close. To maintain a valid graph, lines that are the target of a jump may be split so all lines continue to intersect only at their endpoints. In some embodiments, operation 114 is performed by a processor component the same as or similar to vector phase component 38 (shown in FIG. 1 and described herein).

At operation 116 of method 100, cluster-collapsing may be performed by clustering nodes and joining unconnected objects. As an example, a plurality of nodes that have distances from each other that each satisfies a criterion may be clustered; and objects that are not connected to each other and that have distances from each other that each satisfies another criterion may be joined. Clusters of two or more nodes (endpoints) that are closer than a small tolerance (e.g., 5 pixels) may be collapsed together, possibly removing whole, short lines. This may remove dense areas of geometry mesh caused by noise in the input data and artifacts of the thinning algorithm. In some embodiments, operation 116 is performed by a processor component the same as or similar to vector phase component 38 (shown in FIG. 1 and described herein).

At operation 118 of method 100, spurs detected at a dead-end may be removed. As an example, the one or more spurs, which are shorter than a threshold length, may be removed. Spurs are commonly produced by skeletonization or thinning algorithms, due to small blobs in the mask as well as noise or corners in the mask. Such spurs may be detected and removed by utilizing the graph to find dead ends in lines that are shorter than a threshold length. In some embodiments, operation 118 is performed by a processor component the same as or similar to vector phase component 38 (shown in FIG. 1 and described herein).

At operation 120 of method 100, one or more intersections may be repaired by collapsing a skeletonized intersection and/or by finding a distorted intersection using the connectivity graph. As an example, one or more four-way intersections may be repaired by collapsing detected instances of skeletonized intersections. In this or another example, one or more three-way intersections may be repaired, including when one object intersects but does not pass through another object of the same type, by utilizing the connectivity graph to find distorted intersections and by ignoring an area near the distorted intersection such that: angles of lines are colinear; and the one or more repaired intersections is placed where the colinear pair and third objects meet to connect to the intersection. But herein-contemplated intersection-repair may include any suitable form or structure, including circles and three-way, four-way, five-way, etc. intersections. In some embodiments, operation 120 is performed by a processor component the same as or similar to vector phase component 38 (shown in FIG. 1 and described herein).

At operation 122 of method 100, vertex reduction may be performed. As an example, the lines to generalize or simplify the vertex count may be processed. In some embodiments, vector phase component 38 may perform post-generalization. For example, the lines may be processed again with the Douglas-Peucker algorithm using a larger tolerance. This may reduce the vertex count, producing vectors with a controlled vertex density. The Douglas-Peucker algorithm may not be ideal for this step. It may cause corners and curves to be chopped off in an unexpected and asymmetric manner. As such, another algorithm better suited to preserve the characteristic shapes of roads may be used, to remove noise from straight sections of roads while maintaining fidelity in the curves. In some embodiments, operation 122 is performed by a processor component the same as or similar to vector phase component 38 (shown in FIG. 1 and described herein).

At operation 124 of method 100, the first vectors may be stored, in a file type, such that a software application is operable to edit a first object represented by at least one of the first vectors. In some embodiments, information component 30 may perform a transformation and output. For example, all vectors may be transformed from pixel-space to the coordinate system of the input image using GeoTIFF parameters, and then written to an ESRI Shapefile. An editable map may be created. Operation 124 may include a report indicating conversion completion. For example, outputs of vector phase component 38 may be sent, via information component 30, to a human analyst, who then may potentially clean up further the data and potentially perform their own transportation-based corrections to the data of a particular AOI. In some embodiments, operation 124 is performed by a processor component the same as or similar to information component 30 (shown in FIG. 1 and described herein).

At operation 202 of method 200, first and second aerial images may be obtained, wherein the first and second images are of a same area and are taken at different times. In some embodiments, operation 202 is performed by a processor component the same as or similar to information component 30 (shown in FIG. 1 and described herein).

At operation 204 of method 200, first and second pixel maps may be respectively predicted using the first and second images, via a machine learning model. In some embodiments, operation 204 is performed by a processor component the same as or similar to prediction component 34 (shown in FIG. 1 and described herein).

At operation 206 of method 200, the first and second pixel maps may be respectively converted into pluralities of first and second vectors. In some embodiments, operation 206 is performed by a processor component the same as or similar to raster phase component 36 and vector phase component 38 (shown in FIG. 1 and described herein).

At operation 208 of method 200, the pluralities of first and second vectors may be compared to identify one or more changes.

At operation 302 of method 300, an aerial image may be obtained. As an example, one or more images of a certain region may be sensed from a bird's eye view, e.g., via an aerial vehicle and/or via satellite. The one or more images may be resized for readability and standardized for a trained CNN. As an example, the CNN for performing image recognition on the image may be obtained to identify image features, and the OpenCV library or equivalent may be used at operation 302 to resize one or more portions (e.g., tiles) of the image or to resize the entire image itself. In some embodiments, operation 302 is performed by a processor component the same as or similar to information component 30 (shown in FIG. 1 and described herein).

At operation 304 of method 300, a pixel map may be predicted using the image, via a machine learning model. As an example, advancements in machine learning and geospatial software development may be used to automate the task of road extraction from aerial imagery. Operation 304 may make use of a neural network to perform segmentation of roads in this aerial imagery. These results are then vectorized, which produces an output in the form of geospatial vector data that analysts may freely edit in ESRI tools, such as ArcGIS. In some embodiments, operation 304 is performed by a processor component the same as or similar to prediction component 34 (shown in FIG. 1 and described herein).

At operation 306 of method 300, the pixel map may be converted into a plurality of first geospatial vectors. This geospatial vector data may then be sent to shapefiles (.shp); in this file format, the vectors, in GIS software, may be viewed, edited, and quality metrics may be controlled. In some embodiments, the pixel map may be converted into two-dimensional vectors, which may be placed on top of or otherwise overlay the objects of the imagery having the particular type. In some embodiments, operation 306 is performed by a processor component the same as or similar to raster phase component 36 and vector phase component 38 (shown in FIG. 1 and described herein).

At operation 308 of method 300, a plurality of second vectors and a plurality of third vectors may be obtained. In some embodiments, operation 308 is performed by a processor component the same as or similar to information component 30 (shown in FIG. 1 and described herein).

At operation 310 of method 300, the pluralities of first and second vectors may be compared to determine a first similarity level. In some embodiments, operation 310 is performed by a processor component the same as or similar to information component 30 (shown in FIG. 1 and described herein).

At operation 312 of method 300, the pluralities of first and third vectors may be compared to determine a second similarity level. In some embodiments, operation 312 is performed by a processor component the same as or similar to information component 30 (shown in FIG. 1 and described herein).

At operation 314 of method 300, the plurality of second vectors or the plurality of third vectors may be identified as being more accurate based on the first and second similarity levels.

Techniques described herein may be implemented in digital electronic circuitry, or in computer hardware, firmware, software, or in combinations of them. The techniques may be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps of the techniques may be performed by one or more programmable processors executing a computer program to perform functions of the techniques by operating on input data and generating output. Method steps may also be performed by, and apparatus of the techniques may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory may be supplemented by, or incorporated in special purpose logic circuitry.

Several embodiments of the invention are specifically illustrated and/or described herein. However, it will be appreciated that modifications and variations are contemplated and within the purview of the appended claims.

What is claimed is:

1. A computer-implemented method, comprising:

generating, via a machine learner, a pixel map, wherein the generation comprises outputting a plurality of pixels associated with one or more intermediate values that do not satisfy a criterion for indicating whether each of the plurality of pixels belongs to an object of a same type as a first object;

adjusting a value of each pixel associated with one of the one or more intermediate values such that the each pixel is determined to belong to the object of the same type as the first object or determined not to belong to the object of the same type as the first object;

converting the pixel map into a plurality of first vectors, where the conversion includes a raster phase where the pixel map is converted into skeleton vectors by:

a morphological-cleanup via performing erosion to remove noise and artifacts at a pixel level; and skeletonization via thinning the pixel map to a thickness of one pixel; and storing, in a file type, the first vectors such that a software application is operable to edit the first object represented by at least one of the first vectors.

2. The method of claim 1, further comprising:

performing vectorization, which comprises converting the thinned pixel map to vector form by:

traversing a skeleton map to find one or more neighboring pixels, which represent one or more second objects of a same type as the first object, within a predetermined pixel distance;

extracting a vector in a direction of each of the one or more found pixels; and combining the one or more extracted vectors.

3. The method of claim 2, further comprising:

performing smoothing, which comprises removing a crookedness of the combination.

4. The method of claim 1, wherein the conversion further comprises a vector phase, which includes improving quality and shape of second vectors of the pixel map and removing artifacts by:

performing connectivity-graphing, which includes adding the second vectors to a connectivity graph; and performing gap-jumping, which includes detecting gaps at dead-ends in the connectivity graph.

5. The method of claim 1, further comprising:

performing cluster-collapsing by:

clustering a plurality of nodes that have distances from each other that each satisfies a criterion; and joining objects that are not connected to each other and that have distances from each other that each satisfies another criterion.

6. The method of claim 1, further comprising:

performing spur-removal, which includes:

detecting one or more spurs at a dead-end of a line; and removing the one or more spurs, which are shorter than a threshold length.

7. The method of claim 4, further comprising;

performing intersection-repair, which includes:

repairing one or more four-way intersections by collapsing detected instances of two three-way intersections; and repairing one or more three-way intersections, including when one object intersects but does not pass through another object of the same type, by utilizing the connectivity graph to find distorted intersections and by ignoring an area near the distorted intersection such that:

two lines are colinear; and the one or more repaired intersections is placed where a colinear pair and third objects meet.

8. The method of claim 7, further comprising:

performing vertex reduction, which includes processing the lines to reduce vertex count.

9. The method of claim 1, further comprising:

determining whether each pixel of the map belongs to an object of a same type as the first object.

10. The method of claim 1, further comprising:

transforming the first vectors from a pixel-space to a coordinate system, wherein the transformed vectors are stored.

11. The method of claim 9, wherein the same type is a road or building.

* * * * *